US011150673B2

(12) United States Patent
Bright

(10) Patent No.: US 11,150,673 B2
(45) Date of Patent: Oct. 19, 2021

(54) METHOD OF MONITORING A FLUID LEVEL WITHIN A FLUID VOLUME

(71) Applicant: HYDRO AID LLC, Boca Raton, FL (US)

(72) Inventor: Eugene Bright, Boca Raton, FL (US)

(73) Assignee: HYDRO AID LLC, Boca Raton, FL (US)

( * ) Notice: Subject to any disclaimer, the term of this patent is extended or adjusted under 35 U.S.C. 154(b) by 772 days.

(21) Appl. No.: 15/584,833

(22) Filed: May 2, 2017

(65) Prior Publication Data

US 2017/0235318 A1  Aug. 17, 2017

Related U.S. Application Data

(63) Continuation-in-part of application No. 14/281,448, filed on May 19, 2014, now Pat. No. 9,637,941.

(60) Provisional application No. 61/824,631, filed on May 17, 2013.

(51) Int. Cl.
| | |
|---|---|
| *G05D 9/12* | (2006.01) |
| *G05D 7/06* | (2006.01) |
| *E04H 4/14* | (2006.01) |
| *F04B 49/06* | (2006.01) |
| *E04H 4/12* | (2006.01) |
| *F04B 49/00* | (2006.01) |
| *F04D 15/02* | (2006.01) |
| *C02F 103/42* | (2006.01) |

(52) U.S. Cl.
CPC ............ *G05D 9/12* (2013.01); *E04H 4/1209* (2013.01); *E04H 4/1245* (2013.01); *F04B 49/00* (2013.01); *F04B 49/06* (2013.01); *F04B 49/065* (2013.01); *F04D 15/0236* (2013.01); *G05D 7/0635* (2013.01); *G05D 7/0676* (2013.01); *C02F 2103/42* (2013.01); *C02F 2209/42* (2013.01); *F04B 2203/0208* (2013.01); *F04B 2203/0408* (2013.01); *F04C 2270/24* (2013.01); *Y10T 137/7287* (2015.04); *Y10T 137/7306* (2015.04)

(58) Field of Classification Search
CPC ... C02F 2103/42; C02F 2209/42; G05D 9/12; G05D 7/0635; G05D 7/0675; G05D 7/06; E04H 4/14; E04H 4/1209; E04H 4/1245; F04B 49/00; F04B 49/06; F04B 49/065; F04D 15/0236
USPC ......................................................... 210/744
See application file for complete search history.

(56) References Cited

U.S. PATENT DOCUMENTS

| | | | | |
|---|---|---|---|---|
| 4,817,217 | A | * | 4/1989 | Lively ........................ E04H 4/12 210/138 |
| 2008/0003114 | A1 | * | 1/2008 | Levin .................... F04B 49/002 417/306 |
| 2012/0073040 | A1 | * | 3/2012 | Cohen ........................ E04H 4/12 4/504 |

* cited by examiner

Primary Examiner — Robert Clemente
Assistant Examiner — Akash K Varma
(74) Attorney, Agent, or Firm — The Concept Law Group, PA; Scott D. Smiley; Scott M. Garrett

(57) ABSTRACT

A method of monitoring a low water volume of a water circulation system is disclosed that includes detecting an auxiliary measurement associated with an ancillary device fluidly coupled with a reservoir of water in a water circulation system and then determining whether the ancillary device is performing under a low water volume operation. The low water volume operation is based upon a comparison between at least the detected auxiliary measurement of the ancillary device and a condition associated with a performance of the ancillary device under the low water volume operation.

20 Claims, 11 Drawing Sheets

1100

METHOD OF MONITORING A FLUID LEVEL WITHIN A FLUID VOLUME

CROSS-REFERENCE TO RELATED APPLICATION

This application is a Continuation-in-part Application, which claims priority to co-pending U.S. Non-Provisional patent application Ser. No. 14/281,448 filed May 19, 2014, which claims priority to U.S. Provisional Patent Application No. 61/824,631 filed May 17, 2013, the entireties of which are incorporated by reference.

FIELD OF THE INVENTION

The present invention relates generally to a system and method for monitoring a fluid level within a reservoir of fluid, and more particularly relates to a method of automatically maintaining water levels in the reservoir for optimal system performance.

BACKGROUND OF THE INVENTION

A significant problem associated with maintenance of a fluid reservoir, e.g., a swimming pool, in a system where water is continuously filtered and recirculated through the reservoir is the maintenance, monitoring, and controlling of a water volume in the swimming pool system. Maintaining an optimum volume of water circulating within the system is important because without a proper water volume in a swimming pool, maintenance equipment will not function as designed. As a consequence, the swimming pool will be prone to receiving unfiltered and dirty swimming pool water, in addition to the obvious damage to the pool equipment.

For example, a swimming pool skimmer is a device designed to draw water in from the swimming pool reservoir's surface with a skimming action in order to collect debris, such as leaves, from the top of the swimming pool reservoir's surface. Debris will then settle into the skimmer's mesh basket, while water is channeled through a pipe located at the bottom of the skimmer to a filter. The filter cleans the water by running it through a screen or other separating means. Thereafter, the water is re-routed back to the swimming pool reservoir with a pump. When the water volume circulating through the pool system is below an optimum amount, the skimmer does not function properly. As will be explained in more detail below, this results in improper function of the system pump that will damage the pump and result in unfiltered water.

Unfortunately, in the prior art, devices deigned to automatically maintain proper water volume either come in a form of 1) a hose attachment designed to be installed at the swimming pool reservoir edge, which presents a possible trip hazard and is unsightly; or 2) as a permanent attachment that requires extensive plumbing modifications and dedicated maintenance and cleaning.

Another common theme of those known water volume maintenance designs is the reliance on physical water level sensors that detect a water level within the swimming pool reservoir. This presents a problem for water maintenance systems that are installed away from the swimming pool reservoir edge, because dedicated plumbing is required; otherwise, sensors will not work correctly while the swimming pool pump is running. Additionally, requiring installation of a physical water level sensor within in the swimming pool reservoir presents an eyesore in the swimming pool reservoir and occupies space within the swimming pool reservoir that is preferred by many users to be dedicated to swimming pool enjoyment and use.

Therefore, a need exists to overcome the problems with the prior art as discussed above.

SUMMARY OF THE INVENTION

The invention provides a water volume monitoring system and method that overcomes the hereinafore-mentioned disadvantages of the heretofore-known devices and methods of this general type.

With the foregoing and other objects in view, there is provided, in accordance with the invention, a method of monitoring a low water volume of a water circulation system. The method includes detecting an auxiliary measurement associated with an ancillary device fluidly coupled with a reservoir of water in a water circulation system; and determining whether the ancillary device is performing under a low water volume operation based on a comparison between: the detected auxiliary measurement of the ancillary device; and a condition associated with a performance of the ancillary device under the low water volume operation.

In accordance with yet another feature, the reservoir of water is designated as a swimming pool, a spa, a pond, a fountain, or other similar items.

In accordance with another feature, an embodiment of the present invention includes providing a device communicatively coupled in series between a power line and a pump of the water circulation system, wherein the device includes a processor operable to detect the auxiliary measurement and determine the low water volume operation of the ancillary device.

In accordance with a further feature of the present invention, in response to determining that the ancillary device is performing under the low water volume operation, communicating to a water-flow control device to add fresh water to the water circulation system.

In accordance with another feature, the ancillary device is formed as a swimming pool skimmer, and the auxiliary measurement is a power measurement of a pump coupled to the swimming pool skimmer of the water circulation system.

In accordance with yet another feature, the ancillary device is formed as a pressure sensor operably configured to detect a pressure of the water circulation system, and the auxiliary measurement is a pressure measurement detected by the pressure sensor.

In accordance with a further feature, the ancillary device is formed as a vacuum sensor operably configured to detect a vacuum pressure of the water circulation system, and the auxiliary measurement is a vacuum pressure measurement detected by the vacuum sensor.

In accordance with another feature, an embodiment of the present invention includes receiving a user input via a manual control interface for communicating to a water-flow control device to add fresh water to the water circulation system.

In accordance with a further feature, an embodiment of the present invention includes in response to determining that the ancillary device is performing under the low water volume operation, automatically communicating to a water-flow control device to add fresh water to the water circulation system.

In accordance with another feature, an embodiment of the present invention includes determining whether the detected auxiliary measurement includes a sinusoidal waveform associated with the performance of the ancillary device under the low water volume operation of the water circulation system.

In accordance with another feature, an embodiment of the present invention includes determining whether a detected power measurement of a pump device communicatively coupled to the water circulation system includes a sinusoidal waveform associated with the performance of the pump device under the low water volume operation of the water circulation system.

In accordance with a further feature, an embodiment of the present invention includes determining whether a detected pressure measurement of a pressure sensor communicatively coupled to a filter of the water circulation system includes a sinusoidal waveform associated with a pressure of the water circulation system under the low water volume operation of the water circulation system.

In accordance with yet another feature, an embodiment of the present invention includes determining whether a detected vacuum pressure measurement of a vacuum sensor of the water circulation system includes a sinusoidal waveform associated with a vacuum pressure measurement of the water circulation system under the low water volume operation of the water circulation system.

In accordance with yet another feature, an embodiment of the present invention includes determining whether a detected power measurement of a pump device communicatively coupled to the water circulation system is below a predetermined threshold associated with the performance of the pump device under a non-circulating water volume condition of the water circulation system.

In accordance with yet another feature, an embodiment of the present invention includes determining whether the detected auxiliary measurement is below a predetermined threshold associated with the performance of the ancillary device under a non-circulating water volume condition of the water circulation system.

In accordance with a further feature, an embodiment of the present invention includes determining whether a detected pressure measurement of a pressure sensor communicatively coupled to a filter of the water circulation system is below a predetermined threshold associated with a pressure of the water circulation system under a non-circulating water volume condition of the water circulation system.

In accordance with a further feature of the present invention, an embodiment of the present invention includes a water volume monitor embodied in a computer readable storage medium, the water volume monitor comprising programming instructions for: detecting an auxiliary measurement associated with an ancillary device fluidly coupled with a reservoir of water in a water circulation system; determining whether the ancillary device is performing under a low water volume operation of the water circulation system, based on a comparison between: the detected auxiliary measurement of the ancillary device, and a condition associated with a performance of the ancillary device under the low water volume operation; and in response to determining that the ancillary device is performing under the low water volume operation, communicating to a water-flow control device to add fresh water to the water circulation system.

In accordance with a further feature of the present invention, the reservoir of water is a swimming pool; the ancillary device is formed as a swimming pool skimmer; and the auxiliary measurement is a power measurement of a pump coupled to the swimming pool skimmer of the water circulation system.

In accordance with yet another feature of the present invention, a system includes a swimming pool; a swimming pool skimmer fluidically coupled to the swimming pool; a skimmer outlet coupled to a pipe and disposed in a bottom portion of the swimming pool skimmer; a pump fluidically coupled to the skimmer outlet and the pipe, the pump being operable to pump liquid from the swimming pool skimmer through the skimmer outlet and the pipe as a result of liquid in the swimming pool being at a full level and the pump being operable to pump air from the swimming pool skimmer through the skimmer outlet and the pipe as a result of the liquid in the swimming pool below the full level; and a processor coupled to the pump, the processor operably configured to determine when liquid in the swimming pool is below the full level by monitoring a power measurement of the pump, the power measurement of the pump being different when pumping air as compared to the power measurement of the pump when pumping liquid, and the processor further operably configured to execute computer executable instructions in response to the processor determining that liquid in the swimming pool is below the full level.

In accordance with a further feature of the present invention, the computer executable instructions include at least one of an instruction to transmit a low swimming pool water level indication and an instruction to add liquid to the swimming pool from a fresh water source.

In accordance with yet another feature of the present invention, the computer executable instructions include an instruction to reduce a speed of the pump.

In accordance with another feature of the present invention, the processor is further operably configured to recognize that the power measurement of the pump is sinusoidal-like; and execute the computer executable instructions in response to the processor recognizing that the power measurement of the pump is sinusoidal-like.

In accordance with yet another feature, a method for making use of an indirect measurement of a pool water level includes steps of providing a main water reservoir formed as a pool, the pool being an artificial structure operably configured to store and recirculate water contained within; providing an ancillary reservoir formed as a surface skimmer fluidically coupled, via a skimmer intake, to the pool; providing a recirculation pump, the pump being coupled to a processor and the pump being fluidically coupled to the surface skimmer such that the pump is operable to extract water from the surface skimmer; pumping, by the pump, water from the surface skimmer as a result of water in the pool being within a high-range, the high-range being a pool water level that is at or above a sufficient water level to run the pump without pumping aerated water or air; pumping, by the pump, aerated water from the surface skimmer as a result of the water in the pool being within a mid-range, the mid-range being a pool water level that is below the sufficient water level, but above a bottom of the skimmer intake; pumping, by the pump, air from the surface skimmer as a result of the water in the pool being within a low-range, the low-range being a pool water level that is below the bottom of the skimmer intake; determining, by the processor coupled to the pump, a range within or a threshold level at which a pool water level should be by analyzing power measurements of the pump, the power measurements of the pump being different when pumping water as compared to the power measurement of the pump when pumping aerated water or air; and executing, by the processor coupled to the pump, a computer executable instruction to perform at least one predetermined action based on the determination made by the processor by analyzing the power measurements of the pump in the determining step.

In accordance with a further feature of the present invention, the recirculation pump includes a variable speed motor; and the processor coupled to the pump is further operably configured to determine a speed that the recirculation pump is operating at.

In accordance with yet a further feature of the present invention, the determining step further includes the processor recognizing that the power measurements are sinusoidal-like; as a result of the processor recognizing that the power measurements are sinusoidal-like, the processor further determining that the pool water level is within the mid-range; the processor storing in at least one non-transitory memory a peak power over a predetermined time period after sinusoidal fluctuations are initially detected by the processor; and the processor accessing at least one predetermined speed-to-power lookup table, stored in the at least one non-transitory memory, in order to match a peak power reading during measured sinusoidal fluctuations to an optimal speed for the pump, the optimal speed of the pump being a maximum speed the pump can operate at without pumping in air due to a low water level.

In accordance with yet another feature of the present invention, the least one predetermined speed-to-power lookup table, accessible by the processor coupled to the pump, is updated when the processor detects that an active speed of the pump is running at a stable power reading, thereby establishing an empirical speed-to-power reference.

In accordance with an additional feature of the present invention, the determining step further includes the processor determining the optimal speed using the following formula:

$$\text{optimal speed} = \sqrt{\text{peak power}} * \frac{ref1 \cdot speed + ref2 \cdot speed}{\sqrt{ref1 \cdot power} + \sqrt{ref2 \cdot power}}$$

wherein ref1.speed, ref2.speed, ref1.power, and ref2.power are speed values and power values from the at least one pre-determined speed-to-power lookup table stored in a non-transitory memory accessible by the processor.

In accordance with another feature of the present invention, an indirect measurement of the pool water level is communicated by the processor coupled to the pump as a percentage of an available speed range, as determined by a minimum pump speed and a maximum pump speed and the optimal pump speed in accordance with the following formula:

$$\text{pool level \%} = \frac{\text{optimal pump speed} - \text{minimum pump speed}}{\text{maximum pump speed} - \text{minimum pump speed}}$$

In accordance with yet a further feature of the present invention, the indirect measurement of the pool water level is converted by the processor to a user custom format determined by the following formula:

custom value pool level=((max−min)*pool level %)+min where the max and min in said formula are user-input values.

In accordance with another feature, an embodiment of the present invention may further include steps of providing at least one controllable flow selection valve fluidically coupled to a pump inlet and the pool plumbing associated with the pool; providing at least one pool drain disposed at or proximate a deepest end of the pool, said at least one pool drain being fluidically coupled to the at least one controllable flow selection valve via the pool plumbing; and providing a skimmer outlet disposed at or proximate a bottom of the surface skimmer, said skimmer outlet being fluidically coupled to the at least one controllable flow selection valve via the pool plumbing.

In accordance with yet a further feature of the present invention, the processor coupled to the pump is further operably configured to select, via the at least one controllable flow selection valve, only one out of the skimmer outlet and the pool drain to supply water to the pump through the pump inlet.

In accordance with yet another feature of the present invention, the processor coupled to the pump is further operably configured to select, via the at least one controllable flow selection valve, only the pool drain to supply water to the pump through the pump inlet so as to selectively prevent a water flow from the surface skimmer to the pump.

In accordance with yet another feature of the present invention, the processor coupled to the pump is further operably configured to periodically switch, via the at least one controllable flow selection valve, an exclusive water supply to the pump between the skimmer inlet and the pool drain.

In accordance with yet another feature of the present invention, the at least one predetermined action includes preventing a water flow from the surface skimmer to the pump by the processor controlling the controllable flow selection valve in response to the optimal speed falling below a predetermined level.

In accordance with a further feature of the present invention, a water flow into the pool, from a controllable fresh water valve, is prevented by the processor coupled to the pump, in response to the processor detecting a change to the power measurements of the pump.

In accordance with yet another feature, an embodiment of the present invention further includes steps of providing a fresh water plumbing system fluidically coupled to the pool and at least one controllable fresh water valve fluidically coupled to a fresh water source and controllable by the processor coupled to the pump; and the computer executable instructions, executable by the processor, to perform the at least one predetermined action based on the pump power measurements includes an instruction to control the fresh water valve to refill the pool to raise the pool water level by adding water from the fresh water source.

In accordance with yet another feature of the present invention, the computer executable instructions, executable by the processor, to perform the at least one predetermined action based on the pump power measurements includes an instruction to transmit at least one swimming pool water level indication, the at least one swimming pool water level indication being formed as at least one of a visual alarm, an email notification, a SMS notification, a phone call, a weather station data upload, and a third-party api trigger.

In accordance with yet another feature of the present invention, the determining step further includes the processor recognizing that the power measurements are sinusoidal-like; as a result of the processor recognizing that the power measurements are sinusoidal-like, the processor further determining that the pool water level is within the mid-range; the processor storing in at least one non-transitory memory a peak power over a predetermined time period after sinusoidal fluctuations are initially detected by the processor; and the processor accessing at least one predetermined level-to-power lookup table, stored in the at least one non-transitory memory, to determine a water level corresponding to a measured drop in pump power consumption.

In accordance with yet another feature of the present invention, the computer executable instructions, executable by the processor, to perform the at least one predetermined action based on the pump power measurements includes an instruction to prompt a user to measure a current water level within the pool.

In accordance with yet another feature of the present invention, the processor is further operable to receive a user input of the measured current water level within the pool; and store said user-measured current water level in a look up table stored in a non-transitory memory in reference to an average peak power reading during a time period that the user measured the current water level within the pool.

In accordance with yet a further feature of the present invention, the determining step further includes the processor calculating the water level within the pool according to the following formula:

$$\text{water level} = \sqrt{\text{peak} \cdot \text{power}} * \frac{ref1 \cdot \text{level} + ref2 \cdot \text{level}}{\sqrt{ref1 \cdot \text{power}} + \sqrt{ref2 \cdot \text{power}}}$$

wherein ref1.level, ref2.level, ref1.power, and ref2.power are water level values and power values from at least one predetermined water level-to-power lookup table stored in a non-transitory memory accessible by the processor.

In accordance with another feature, an embodiment of the present invention further includes steps of providing at least one controllable flow selection valve fluidically coupled to the pump inlet and the pool plumbing associated with the pool; providing at least one pool drain disposed at or proximate a deepest end of the pool, said at least one pool drain being fluidically coupled to the at least one controllable flow selection valve via the pool plumbing; providing a skimmer outlet disposed at or proximate a bottom of the surface skimmer, said skimmer outlet being fluidically coupled to the controllable flow selection valve via the pool plumbing; and wherein the computer executable instructions, executable by the processor, to perform the at least one predetermined action based on the pump power measurements includes an instruction to change a state of the at least one controllable flow selection valve to prevent a water flow from the surface skimmer for a predefined period of time.

Although the invention is illustrated and described herein as embodied in a water volume monitoring system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a water surface of water within a water reservoir. The terms "program," "software application," and the like as used herein, are defined as a sequence of instructions designed for execution on a computer system. A "program," "computer program," "programming instructions," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
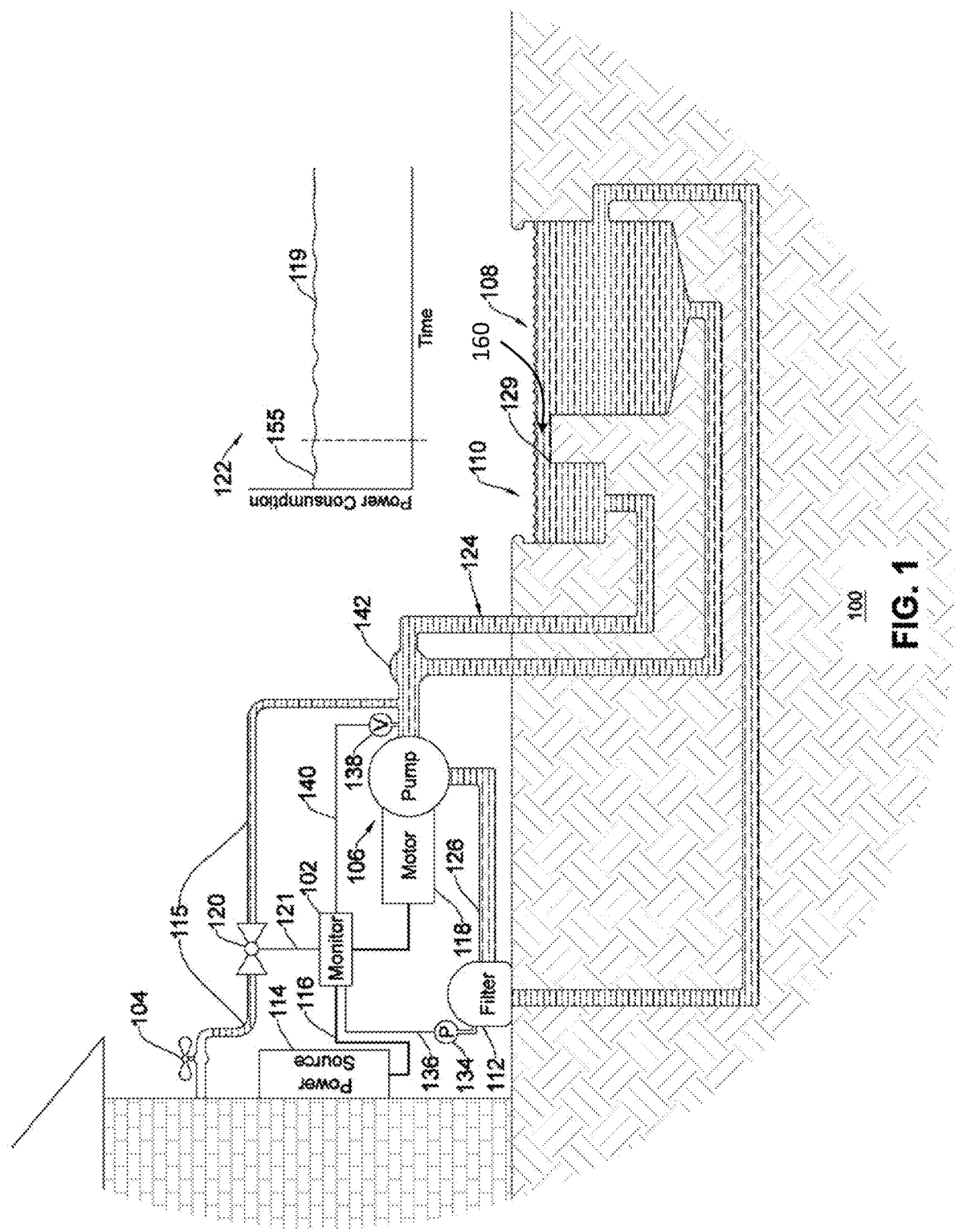
FIG. 1 is a schematic diagram of an exemplary implementation of a water circulation system in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient apparatus, system, and method for continuously monitoring and maintaining water volume of a water circulation system, without requiring a mechanical water level sensor to be installed within a reservoir of the water circulation system. Embodiments of the invention provide a method of utilizing a measurement from a pre-existing ancillary device that supports circulation of water through the water circulation system. In addition, embodiments of the invention provide a method of comparing a detected measurement to a reference measurement associated with low water volume operation in order to determine if the water circulation system is operating under low water volumes; and, automatically adding fresh water to correct the water deficiency.

System/Network

Referring now to FIG. 1, one embodiment of the present invention is shown in a schematic view. FIG. 1 shows several advantageous features of the present invention, but, as will be described below, the invention can be provided in several shapes, sizes, combinations of features and components, and varying numbers and functions of the components. The first example of a water circulation system 100 in accordance with the present invention, as shown in FIG. 1, includes a water volume monitoring device 102, a fresh water source 104, a pump 106, a reservoir 108, a skimmer 110, a filter 112, and a power source 114. The system 100 is operable to filter water from the reservoir 108, recirculate filtered water back into the reservoir 108, monitor water volume, and replenish the system 100 with fresh water that is lost via evaporation and other water loss conditions. The water circulation system 100 circulates fluid, such as water. The water may also include other elements such as chlorine or other chemicals. The reservoir 108 may also be considered a pool, which is an artificial, man-made structure sized, shaped, and operably configured to store and recirculate water contained within the pool.

Figure 2:
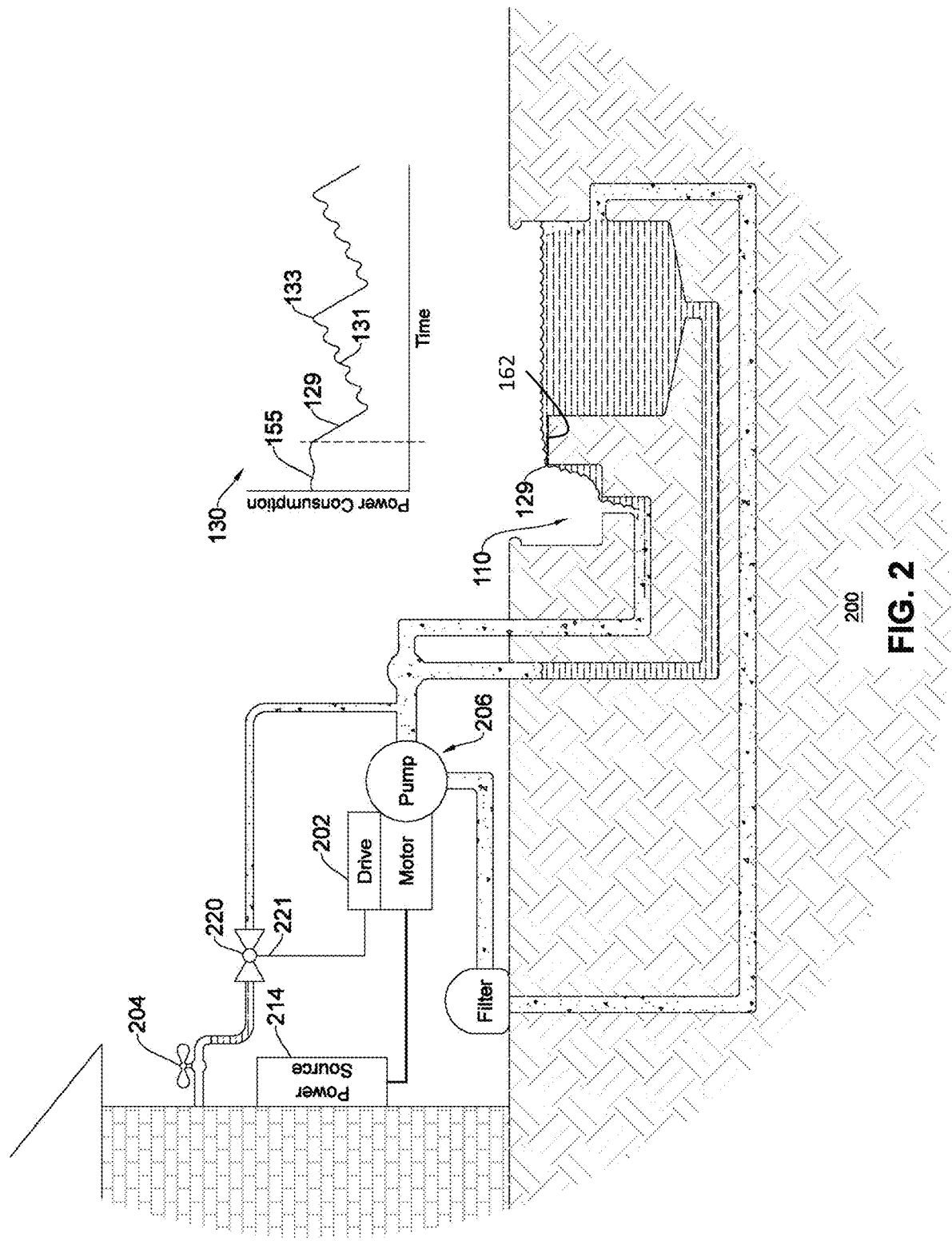
FIG. 2 is a schematic diagram of another exemplary implementation of a water circulation system in accordance with the present invention.
Figure 3:
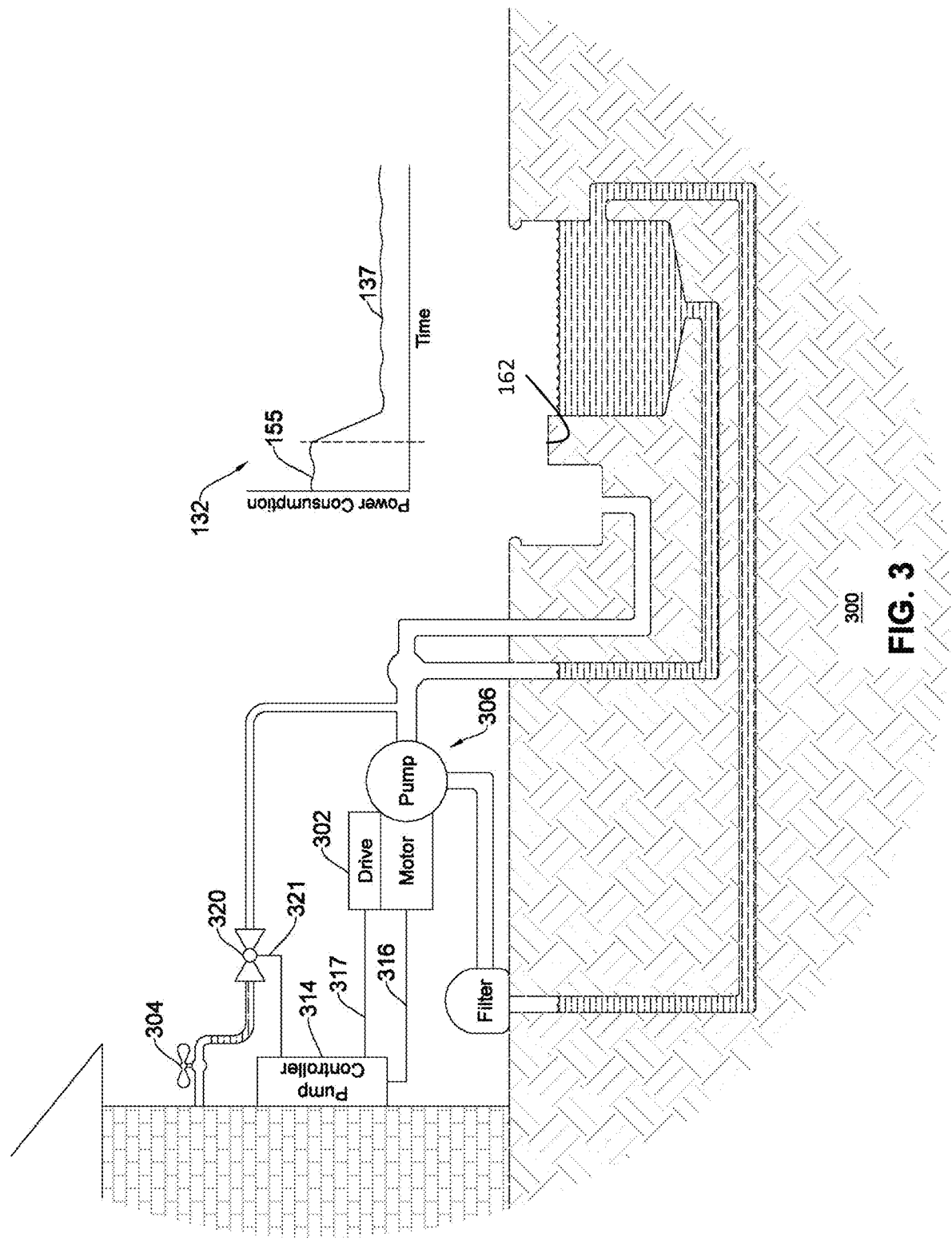
FIG. 3 is a schematic diagram of yet another exemplary implementation of a water circulation system in accordance with the present invention.

The water volume monitoring device 102 can be an electronic device that comprises computer instructions to monitor water volume and automatically add fresh water to the system when low water volume operation is detected. The water volume monitoring device 102 can be provided as either a stand-alone unit, as illustrated in FIG. 1, or can be integrated into the pump 106, as illustrated in FIGS. 2-3. As a stand-alone unit, the water volume monitoring device 102 can be communicatively coupled in series between a power line 116, coupled to the power source 114, and the pump 106. The water volume monitoring device 102 includes a processor operable to perform processes and methods in accordance with the present invention, said processes and methods described herein throughout and particularly in the section below entitled "Process." Further, as is known by those of ordinary skill in the art, said processor can be considered to be operably configured to execute computer executable instructions to perform some or all of the processes, methods, techniques, and/or features described herein throughout (even where the phrase "computer executable instructions" is not expressly stated). Stated another, persons of ordinary skill in the art will understand that a processor or processing device will be required, or likely utilized, to perform some or all of the processes, methods, techniques, and/or features described herein.

In addition, the terms "water level" and "water volume" are used interchangeably herein, but it should be understood by those of ordinary skill in the art that such terms are user to indicate generally the same thing, namely, an amount of water/fluid within the reservoir 108, regardless of a particular unit of measurement used at a particular instance (e.g., a volume unit, a length unit at which a top level of the water sits relative to a reference value, a percentage of a total desired level, etc.).

The water volume monitoring device 102 can include a power sensor operably configured to detect power consumed by a motor 118 of the pump 106. Accordingly, the water volume monitoring device 102 can determine whether the pump 106 is performing under a "low water volume" operation by comparing the detected power consumption to a reference power consumption condition that is associated with a performance of the pump 106 under low water volume operation. Such reference power consumption conditions for low water volume operation, or other operational conditions, may be stored in, for example, a lookup table that can be used by a processor associated with the device 102 and/or the pump 106 to compare to the measured power consumption of the pump 106. As discussed herein, low water volume operation can be defined by the user and/or manufacturer to be any parameter associated with low water volume operation. In some embodiments, the device 102 (or another processing device associated with the system) may be operably configured to develop and collect operational pump data to determine low water volume operational parameters.

Advantageously, detecting power consumption of the pump 106, which is typically a pre-existing device of the water circulation system 100, does not require directly measuring water volume of the reservoir 108, by, for example, using a mechanical water level sensor installed in the reservoir 108, as with the prior art. In response to determining whether the pump 106 is performing under low water volume operation, the water volume monitoring device 102 can communicate to a water-flow control device 120, via a communication link 121, e.g., wiring, to add fresh water from the fresh water source 104 to the reservoir 108. The water-flow control device 120 can be formed as a water valve, water solenoid, or actuator operable to turn on and off in order to add and, alternatively, stop water flow from the fresh water source 104 to the reservoir 108, through a water hose 115. In one embodiment, the water hose 115 is coupled substantially proximate a pump inlet 142, disposed away from the reservoir 108 area. In this manner, water can be added directly to the pump 106, without having to route the water hose 115 to the reservoir 108. Ancillary equipment, such as the pump 106, is typically disposed out of sight from the primary reservoir area, thereby not presenting a tripping hazard or an eyesore proximate the reservoir 108 area. Many homes include a fresh water source 104, such as a water outlet, proximate the pump 106. The communication link 121 can be a wired or wireless communication link, communicatively coupling the water-flow control device 120 and the water volume monitoring device 102. In one embodiment, the communication link 121 is a wired communication link operable to transmit a power signal to the water-flow control device 120, which activates the addition of fresh water.

In another embodiment, the water volume monitoring device 102 includes a manual control interface operably configured to receive a user input via the manual control interface for communicating to a water-flow control device 120 to add fresh water to the water circulation system 100. The manual control interface can be in the form of a button, a lever, a touchscreen, a dial, a mouse, a keypad, and any user input interface operable to receive a user input for manually activating the addition of fresh water from the fresh water source 104. The water volume monitoring device 102 can include settings that users can configure in order to select whether the user desires a manual user-initiated addition of fresh water, or an automatic addition of fresh water. The manual control interface provides an advantage not found in prior art systems. In particular, it provides an optional interface that allows a reservoir owner, such as a pool owner, to trigger water addition manually, independent of the current water level. During manual operation of this system it does not matter if the pump is running or not. Also, unlike other methods of adding water to the pool manually, such as putting a hose into the pool and turning on the water, the manual interface does not require more than a single user-input, such as pushing a button, and water will automatically be stopped when predetermined amount was added to the system.

Power consumption of the pump 106 is associated with operation of the skimmer 110. In one embodiment, the skimmer 110 is a swimming pool skimmer. The skimmer 110 may also be referred to as a surface skimmer. As illustrated in FIG. 1, which shows the system 100 operating at optimum water volume, the pump 106 is communicatively coupled to the skimmer 110. A water level of the reservoir 108 is above an edge 129 of the reservoir 108 coupled to the skimmer 110 such that water passes over the edge 129 from the reservoir 108 to the skimmer 110. The pump 106 draws water in via a skimmer pipe 124 through the pump inlet 142 and to a filter pipe 126. Thereafter, the water is channeled through the filter 112, for water treatment and cleansing, and back to the reservoir 108 via a return pipe 128. As illustrated in an optimal water volume graph 122, when the system is operating with optimum water volume, the pump 106 is consuming an amount of power at a relatively constant magnitude 119 at an approximate optimal power consumption level 155.

As illustrated in FIG. 2, which shows another exemplary water circulation system 200 in accordance with the present invention, the system 200 is operating at low water volume. Like features of the water circulation system 200 are numbered the same except preceded by the numeral '2.' The water level of the reservoir 108 is only slightly above the edge 129 such that only a small amount of water passes over the edge 129 from the reservoir 108 to the skimmer 110. This results in the pump 106 also drawing in air through the skimmer pipe 124. The air and water mix, resulting in aerated water passing through the pump inlet 142. Air requires less power to move from one location to another. Accordingly, as illustrated in a low water volume graph 130, when the system is operating with low water volume, the pump 106 is consuming power at a sinusoidal magnitude, resulting in a detected power measurement including a sinusoidal waveform. The power drops substantially at 129 when the pump 106 draws in air from the skimmer 110. The pump 106 primes, attempting to eliminate aerated water, at 131. At 133 the pump has substantially eliminated air and is pumping water. However, because there is low water volume, the pump 106 draws in more air from the skimmer 110, and the cycle repeats, resulting in a sinusoidal waveform of the power consumed by the pump 106.

As illustrated in FIG. 3, which shows yet another exemplary water circulation system 300 in accordance with the present invention, the system 300 is operating under a non-circulating water volume condition. Like features of the water circulation system 300 are numbered the same except preceded by the numeral '3.' The water level of the reservoir 108 does not rise beyond the edge 129 of the reservoir 108 such that water in the reservoir 108 does not pass over the edge 129 from the reservoir 108 into the skimmer 110. This results in a "dry state" in which the pump 106 only draws air through the skimmer pipe 124, which can damage the pump 106 because it is designed to pump water, not air. Accordingly, as illustrated in the non-circulating water volume graph 132, when the system is operating in the dry state, the pump 106 is consuming very little power because air requires less power to move from one location to another. This results in a detected power measurement 137 well below the optimal power consumption level 155. Accordingly, the water volume monitoring device 102 can be operably configured to determine whether the detected power measurement from the pump 106 falls below a predetermined threshold for a predetermined period of time. In one embodiment, the predetermined threshold is an amount at or, preferably, substantially below the optimal power consumption level 155 of the optimal water volume graph 122. Further, the predetermined time period may be a time period that exceeds a single sinusoidal period of the sinusoidal waveform for the low water volume graph 130. As pumps vary in horsepower and output head, the specific power graph and corresponding threshold may be readily obtained by a person of skill in the art with routine and simple experimentation.

As can be seen by a comparison of FIG. 1 with FIGS. 2 and 3, the arrangement of the skimmer 110, the reservoir 108, and the pump 106 shown in said figures tends to induce or create a requirement that there be a sufficient water level within the reservoir 108, below which the active area of the skimmer intake 160, as determined by the product of a width of the skimmer intake 160 and a height of the water level above a bottom 162 of the skimmer intake 160, is not sufficient to provide the water flow necessary to fully fulfill the flow out of the skimmer 110 into the pump 106. Stated another way, FIG. 1 illustrates an optimal or sufficient pool water level where the pump 106 is able to pump water from the skimmer 110 at a "high-range" pool water level, the high-range pool water level being a pool water level that is at or above a sufficient pool water level to run the pump 106 without pumping aerated water or pure air. FIG. 2 can be considered to illustrate a pool water level that is at a mid-range, with the pump 106 pumping aerated water from the skimmer 110, the "mid-range" pool water level being below the sufficient water level, but above the bottom 162 of the skimmer intake 160. As can be seen in the low water volume graph 130 depicted in FIG. 2, the power measurements are sinusoidal-like in the mid-range pool water level. FIG. 3 can be considered to illustrate a pool water level that is at a low-range, with the pump 106 pumping pure air from the skimmer 110, the "low-range" pool water level being a pool water level that is below the bottom 162 of the skimmer intake 160.

Referring still primarily to FIGS. 1-3, the system 100 can further include a pressure sensor 134 operably configured to detect a pressure of the system 100. The pressure sensor 134 can be coupled in series, via a communication link 136, between the water volume monitoring device 102 and the filter 112. In an alternative embodiment, the pressure sensor 134 can be coupled to another component of the system 100 at another location within the system 100 for detecting a pressure measurement that may be associated with a low water volume or a dry state of the system 100. In yet another embodiment, the pressure sensor 134 can be integrated into the filter 112. The communication link 136 can be a wired or wireless communication link, communicatively coupling the pressure sensor 134 and the water volume monitoring device 102. As with the power consumption of the pump 106, described above with reference to the graphs 122, 130 and 132, a pressure measurement of the system 100 will vary according to optimum water volume, low water volume, and dry state water volume conditions of the system 100. When the system 100 is operating at optimum water volume, the pressure measurement will remain at a relatively constant magnitude at an approximate optimal pressure level, similar to the optimal water volume graph 122.

Alternatively, when the system 200 is operating at low water volume, the pressure measurement will approximate a sinusoidal waveform, similar to the low water volume graph 130, resulting in a detected pressure measurement including a sinusoidal waveform. When the system 300 is operating in a dry state condition, the detected pressure measurement will be very low, resulting in a detected pressure measurement well below the optimal pressure level, similar to the non-circulating water volume graph 132. Accordingly, the water volume monitoring device 102 can be operably configured to determine whether the detected pressure measurement from the pressure sensor 134 falls below a predetermined threshold for a predetermined period of time. In one embodiment, the predetermined threshold is an amount at or, preferably, substantially below the optimal pressure level of the system 100. In another embodiment, the predetermined time period can be a time period that exceeds a single sinusoidal period of the sinusoidal waveform for pressure at the low water volume condition.

The system 100 can further include a vacuum sensor 138 operably configured to detect a vacuum pressure of the system 100. As used herein, the term "vacuum pressure" is intended to indicate a pressure substantially lower than an ambient pressure. The vacuum sensor 138 can be coupled, via a communication link 140, between the water volume monitoring device 102 and the pump 106. The communication link 140 can be a wired or wireless communication link, communicatively coupling the vacuum sensor 138 and the water volume monitoring device 102. As with the power consumption of the pump 106, described above with reference to the graphs 122, 130 and 132, and the pressure measurement from the pressure sensor 134, the vacuum pressure measurement from the vacuum sensor 138 will vary according to optimum water volume, low water volume, and dry state water volume conditions of the system 100. When the system 100 is operating at optimum water volume, the vacuum pressure measurement from the vacuum sensor 138 will remain at a relatively constant magnitude at an approximate optimal vacuum pressure level, similar to the optimal water volume graph 122. Alternatively, when the system 200 is operating at low water volume, the vacuum pressure measurement from the vacuum sensor 138 will approximate a sinusoidal waveform, similar to the low water volume graph 130, resulting in a detected vacuum pressure measurement including a sinusoidal waveform. When the system 300 is operating in a dry state condition, the detected vacuum pressure measurement from the vacuum sensor 138 will be very low, resulting in a detected vacuum pressure measurement well below the optimal pressure level, similar to the non-circulating water volume graph 132.

In one embodiment, the water volume monitoring device 102 includes an external interface operable to indicate to a user, such as an owner or an operator, that the system 100 is operating under low water volume or dry state conditions. In one embodiment, the external interface can be a light emitting diode (LED) or other light source, configured to blink as an indication of low water volume. In another embodiment, the external interface can be a network interface configured to communicate a message via a wired or wireless network to the owner or operator that the system 100 is operating under lower water volume. The message can be a text message sent via a cellular network or an email sent via the Internet. The water volume monitoring device 102 is discussed in more detail below with reference to FIGS. 5-6.

Referring now primarily to FIG. 2, the water circulation system 200 is shown, illustrating an exemplary implementation of a smart pump 206 including a processor operable to execute a water volume monitoring software module 202 saved in non-volatile memory communicatively coupled to the processor. Many pumps currently available are "smart pumps," which include a processor operable to execute specialized software applications configured for operation of the pump hardware. The water volume monitoring software module 202 can be implemented as firmware on the smart pump 206, in contrast to the stand-alone water volume monitoring device 102, as illustrated in FIG. 1, which is a device that is separate from the pump 106. The water volume monitoring software module 202 can be a computer program product embodied in a computer readable storage medium for monitoring low water volume of the water circulation system 200. The water volume monitoring software module 202 can be software, firmware, or any other executable instruction set operable to be executed by a data processing device on the smart pump 206. The executable instruction set can include instructions for processes and methods discussed herein, in accordance with the present invention. In one embodiment, a power source 214 can be directly coupled to the smart pump 206 via a power line 216. In another embodiment, a water-flow control device 220 can be directly coupled to the smart pump 206 via a communication link 221. In this embodiment, the water volume monitoring software module 202 can control water flow from the water-flow control device 220 directly, by, for example, opening and closing a water valve. The communication link 221 can be a wired or wireless communication link.

Referring now primarily to FIG. 3, the water circulation system 300 is shown, illustrating an implementation of the system 300 including a pump controller 314 communicatively coupled to a pump 306 with a water volume monitoring module 302. The pump controller 314 provides the pump 306 with power, via a power line 316, as well as, a control interface for receiving user-input commands and sending commands, particularly commands to control a water-flow control device 320. The water-flow control device 320 is commutatively coupled to the pump controller 314 via a communication link 321. The water volume monitoring module 302 can include instructions for commanding the pump controller 314, via a communication link 317, to turn the water-flow control device 320 on and off. This allows the pump 306 to automatically add water to the system 300 in order to correct water deficiencies associated with low water volume.

Computer

Figure 4:
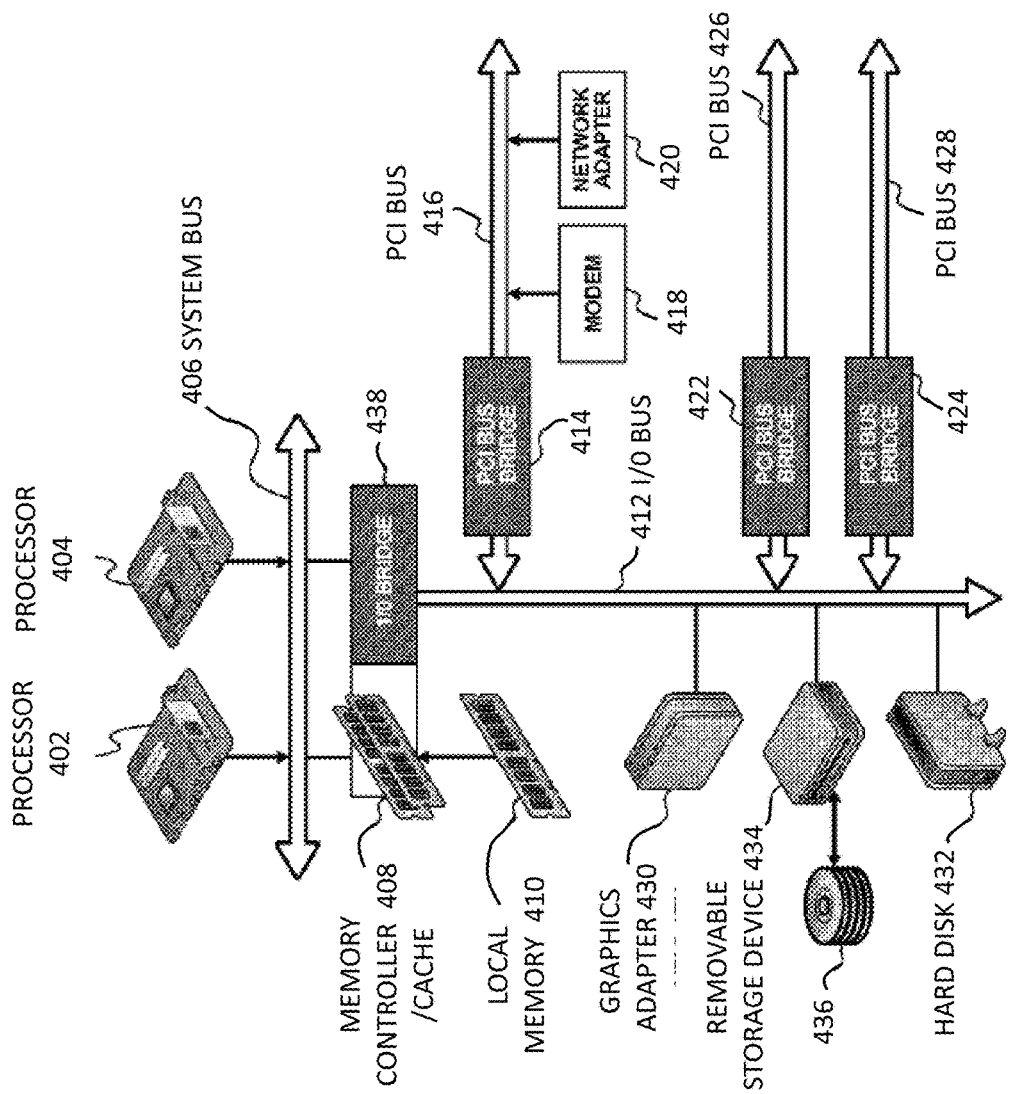
FIG. 4 is a schematic diagram of a data processing system that may be operably configured to implement a method of monitoring a low water volume of a water circulation system in accordance with the present invention.

Referring now primarily to FIG. 4, a block diagram of a data processing system 400 that may be implemented as the water volume monitoring device 102, or implemented as the smart pump 206, 306 with an integrated water volume monitoring software module 202, 302, as shown in FIGS. 2 and 3, respectively, in accordance with embodiments of the present invention. The data processing system 400 may be a symmetric multiprocessor (SMP) system including a plurality of processors 402 and 404 connected to system bus 406. Alternatively, a single processor system may be employed. Also, connected to system bus 406 is memory controller/cache 408, which provides an interface to local memory 410. An I/O bus bridge 438 is connected to system bus 406 and provides an interface to I/O bus 412. The memory controller/cache 408 and I/O bus bridge 438 may be integrated as depicted. The processor 402 or 404 in conjunction with memory controller 408 controls what data is stored in memory 410. The processor 402 and/or 404 and memory controller 408 can serve as a data counter for counting the rate of data flow to the memory 410 or from the memory 410 and can also count the total volume of data accessed to or from the memory 410. The processor 402 or 404 can also work in conjunction with any other memory device or storage location.

Peripheral component interconnect (PCI) bus bridge 414 connected to I/O bus 412 provides an interface to PCI local bus 416. A number of modems 418, or wireless cards, may be connected to PCI bus 416. Typical PCI bus implementations will support four PCI expansion slots or add-in connectors. PCI includes, but is not necessarily limited to, PCI-X and PCI Express components. Communications links between components of the system 100, 200, and 300 in FIGS. 1-3 may be provided through the modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, the data processing system 400 allows connections to a multiple network of computers. A graphics adapter 430 and hard disk 42 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The water volume monitoring device 102 and modules 202, 302 is explained in detail herein and can be used in conjunction with a computer program. Computer programs (also called computer control logic) are stored in memory such as main memory 410, removable storage drive 434, removable media 436, hard disk 432, and signals. Such computer programs, when executed, enable the computer system to perform the features of the present invention as discussed herein. In particular, the computer programs, when executed, enable the processor 402 and/or 404 to perform the features of the water volume monitoring device 102 and modules 202, 302.

In this document, the terms "computer program medium," "computer usable medium," and "computer readable medium" are used to generally refer to media such as main memory 410, removable storage drive 434, removable media 436, hard disk 432, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired or wireless network, that allows a computer to read such computer readable information.

Figure 5:
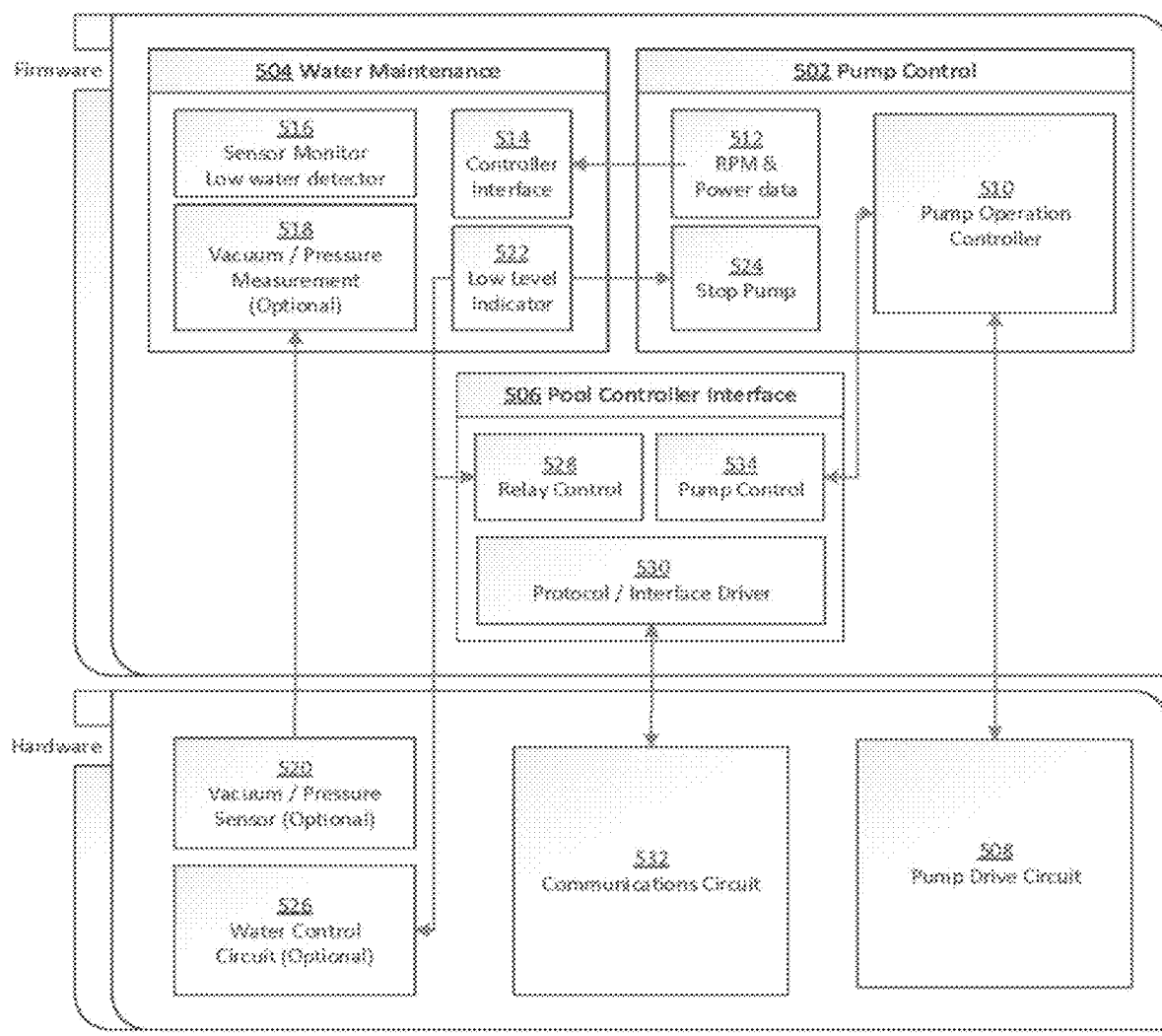
FIG. 5 is a block diagram of an exemplary system for monitoring a low water volume of a water circulation system in accordance with the present invention.

Referring now primarily to FIGS. 2-3 and 5, an exemplary embodiment of the water volume monitoring software module 202 integrated with the smart pump 206 is illustrated in a block diagram, in accordance with the present invention. The water volume monitoring software module 202 is preferably integrated with the smart pump 206 as firmware stored in non-volatile memory housed within a pump housing and communicatively coupled with hardware and circuitry associated with the smart pump 206. The water volume monitoring software module 202 can include a pump control feature 502, a water maintenance feature 504, and a swimming pool controller interface feature 506. The pump control feature 502 includes a pump operation controller 510 that controls normal pump operation of pump hardware via the pump drive circuit 508. The pump control feature 502 also measures operational parameters of the smart pump 206, such as revolutions per minute (rpm) and power measurements 512. These power measurements 512 can be communicated to the water maintenance feature 504 for determining whether the smart pump 206 is performing under a low water volume operation, in accordance with the present invention. The water maintenance feature 504 includes a controller interface 514 that is operably configured to receive and interpret information from the pump control feature 502. The controller interface 514 can communicate the power measurements 512 to a low water detector feature 516.

The low water detector feature 516 can include instructions for determining whether the smart pump 206 is performing under low water volume, or dry state operation by comparing detected power measurements 512 to a reference power measurement associated with a performance of the smart pump 206 under low water volume or dry state conditions. In one embodiment, the reference power measurement can be a predetermined value that is stored in nonvolatile memory of the smart pump 206. In another embodiment, the reference power measurement can be one of a sinusoidal waveform representing low water volume operation and a minimum threshold value representing dry state operation, as explained herein above, with reference to FIGS. 1-3. In a further embodiment, the low water volume detector 516 can determine whether the smart pump 206 is performing under low water volume, or dry state operation by comparing detected pressure sensor and/or vacuum sensor measurements 518, received from a pressure sensor and/or a vacuum sensor 520, to a reference pressure measurement associated with a predetermined, expected pressure of the system 100 under low water volume or dry state conditions. In response to detecting a low water volume or dry state condition, a low water volume indicator 522 can be triggered.

In one embodiment, triggering the low water volume indicator 522 can result in the water maintenance feature 504 communicating to the pump control feature 502 to stop the smart pump 206 in order to minimize wear and tear on the smart pump 206 that may result from abnormal operational conditions. Accordingly, a stop pump feature 524 communicates to the pump operation controller 510 to stop operation of the smart pump 206. In another embodiment, triggering the low water volume indicator 522 can result in the water maintenance feature 504 adding fresh water to the system 100. Where the smart pump 206 includes the direct, communication link 221 to the water-flow control device 220, as illustrated in FIG. 2, the water maintenance feature 504 can communicate with a water control circuit 526 to turn on the water-flow control device 220 for releasing the flow of water from a fresh water source 204. Alternatively, where the smart pump 206 is communicatively coupled to the pump controller 314 via the communication link 317, as illustrated in FIG. 3, the water maintenance feature 504 can communicate with a relay control 528 of the swimming pool controller interface feature 506 to add water. In other embodiments, there may be other predetermined actions taken by the smart pump 206 (in the form of executing computer instructions) in response to detecting a low water volume or a dry state condition, as will be discussed in more detail below (e.g., changing a speed of the pump, or preventing water flow from the skimmer to the pump, etc.).

An interface driver 530 facilitates communication between the swimming pool controller interface feature 506 and a communications circuit 532, which is operable to command the pump controller 314 to turn on the water-flow control device 320 for releasing the flow of water from a fresh water source 304. In one embodiment, the low water volume indicator 522 can be a status flag that remains set until it is determined that low water volume conditions are cleared. In response to the status flag clearing, the smart pump 206 can resume operation and the water-flow control device 220 can stop the flow of fresh water into the system 100. A pump control feature 534 is provided to communicate information and commands between the swimming pool controller 314 and the pump operation controller 510.

Figure 6:
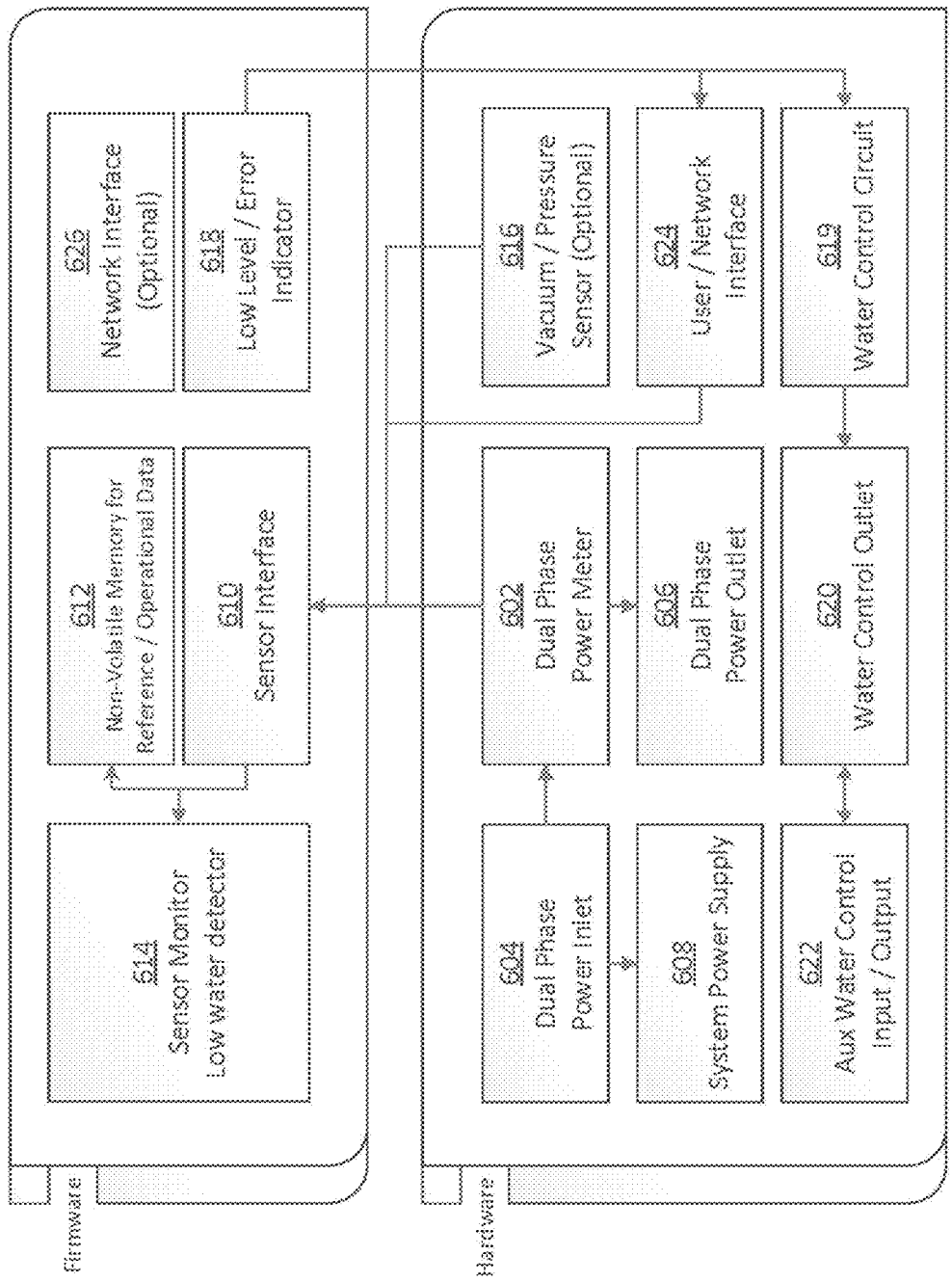
FIG. 6 is a block diagram of another exemplary implementation of a stand-alone apparatus for monitoring a low water volume of a water circulation system in accordance with the present invention.

Referring now primarily to FIGS. 1 and 6, an exemplary embodiment of the water volume monitoring device 102, which is a stand-alone unit, is illustrated in a block diagram, in accordance with the present invention. The water volume monitoring device 102 can be implemented as firmware stored in non-volatile memory housed within a device housing. In one embodiment, the water volume monitoring device 102 is operably configured to determine whether power consumed by the pump 106 demonstrates characteristics associated with low water volume and dry state conditions, in accordance with the present invention. Accordingly, the water volume monitoring device 102 can include a power sensor 602.

The power sensor 602 can be in the form of a power meter operably configured to detect a power measurement of the pump 106. Power can be routed from the power source 114 into a power inlet 604 of the water volume monitoring device 102, through the power sensor 602, and out to the smart pump 206 via a power outlet 606. A small amount of power received from the power source 114 is reserved for operation of the water volume monitoring device 102 via a system power supply 608. Power measurement detected by the power sensor 602 is communicated to a sensor interface 610, which facilitates communication between computer instructions embodied in firmware and hardware components. Operational parameters may be stored into non-volatile memory 612, such as predetermined threshold conditions associated with low water volume and dry state operation.

A low water volume detector 614 can be operably configured to determine whether the pump 106 is performing under low water volume operation by comparing detected power measurements to predetermined threshold conditions associated with performance of the pump 106 under low water volume and dry state operation. In an alternative embodiment, the low water volume detector 614 can determine whether the pump 106 is performing under low water volume, or dry state operation by comparing detected pressure sensor and/or vacuum sensor measurements, received from a pressure sensor and/or a vacuum sensor 616, to a predetermined reference pressure measurement associated with a predetermined, expected pressure of the system 100 under low water volume or dry state conditions.

In yet another embodiment, detected pressure and/or vacuum sensor measurements can be used as a substitute if power measurements from the power sensor 602 are unavailable. In response to detecting a low water volume or dry state condition, a low water volume indicator 618 can be triggered. In one embodiment, triggering the low water volume indicator 618 can result in triggering a water control circuit 619 to energize a water control outlet 620 to activate the water-flow control device 120 to provide fresh water to the system 100. In another embodiment, the water volume monitoring device 102 can include an auxiliary connector 622 for allowing more than one pump 106 to be monitored without requiring an additional water-flow control device 120. A user-interface 624 can be provided to allow the user to input operational parameters and allow the user to receive and view status and error indicators associated with the system 100. In one embodiment, a network interface 626 is provided to facilitate communication with a network, such as the Internet or a cellular network, for sending email notifications and text messages including status and error information associated with the system 100.

An advantage of the measurement technique of the present invention is that it does not require any additional equipment near the reservoir 108, such as a swimming pool, does not produce any unsightly equipment adjacent to the swimming pool or surrounding area, and does not present a tripping hazard from a supply hose. The system can be installed adjacent to or with the swimming pool pumps that and are typically kept out of sight for safety and aesthetics.

Process

The above-described hardware, firmware, and associated data processing components are useful for implementing inventive methods in accordance with embodiments of the present invention and which allow users to continuously monitor low water conditions in water circulation systems, such as swimming pool systems, and automatically take actions to protect ancillary equipment and increase water volume to bring the system into an optimal operating condition.

Figure 7:
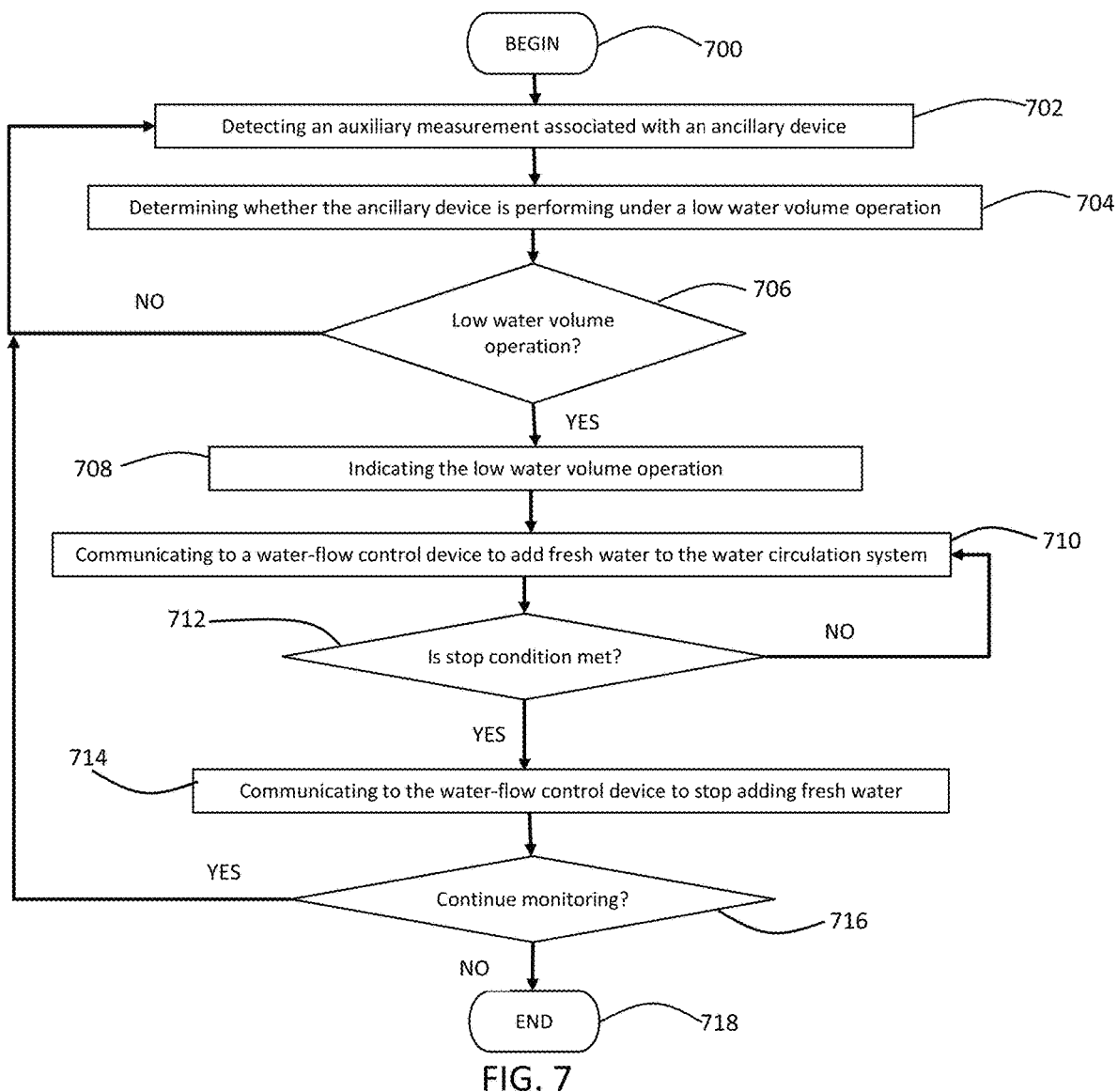
FIG. 7 is a process flow chart representing an exemplary method of monitoring a low water volume of a water circulation system in accordance with the present invention.

FIG. 7 illustrates a single process flow diagram of one embodiment of the present invention. The process flow provides exemplary steps for carrying out an exemplary embodiment of the present invention. The invention, however, is not limited to the number or order of steps shown in FIG. 7. Additionally, one or more blocks shown in succession may, in fact, be executed substantially concurrently, or the blocks may sometimes be executed in the reverse order, depending upon the functionality involved.

The process flow starts at step 700 and moves directly to step 702 where a water volume monitor, such as the water volume monitoring device 102 and the water volume monitoring modules 202, 302, detects an auxiliary measurement associated with an ancillary device of the water circulation system 100. As used herein, the term "auxiliary measurement" is defined as any measurement that is not associated with a direct measurement of water level. The auxiliary measurement is preferably not a water level of the reservoir 108. In one embodiment, the auxiliary measurement is a power measurement of the pump 106 that is coupled to the skimmer 110 of the water circulation system 100. In other embodiments, the auxiliary measurement can be a pressure measurement detected by the pressure sensor 134 or a vacuum pressure measurement detected by the vacuum sensor 138. In a further embodiment, the auxiliary measurement is a pressure measurement detected by the pressure sensor 134 communicatively coupled to the filter 112. As used herein, the term "ancillary device" is defined as a device supporting operation of the water circulation system 100. In one embodiment, the ancillary device is formed as the skimmer 110. In other embodiments, the device is formed as the pressure sensor 134 and the vacuum sensor 138.

The process proceeds to step 704 wherein the water volume monitor determines whether the ancillary device is performing under a low water volume operation of the water circulation system 100. The water volume monitor determines this based on the detected auxiliary measurement of the ancillary device and a condition associated with a performance of the ancillary device under the low water volume operation. In one embodiment, the water volume monitor compares the detected auxiliary measurement with the condition to determine if the difference between them meets a predetermined threshold.

In a further embodiment, the water volume monitor determines whether the detected auxiliary measurement includes a sinusoidal waveform associated with the performance of the ancillary device under the low water volume operation of the water circulation system 100. In yet another embodiment, the water volume monitor determines whether the detected power measurement of the pump 106 includes a sinusoidal waveform associated with the performance of the ancillary device under the low water volume operation of the water circulation system 100. In a further embodiment, the water volume monitor determines whether the detected pressure measurement of the pressure sensor 134 communicatively coupled to the filter 112 includes a sinusoidal waveform associated with the performance of the ancillary device under the low water volume operation of the water circulation system 100. In yet a further embodiment, the water volume monitor determined whether the detected vacuum pressure measurement of the vacuum sensor 138 includes a sinusoidal waveform associated with the performance of the ancillary device under the low water volume operation of the water circulation system 100. In another embodiment, the water volume monitor determines whether the detected power measurement of the pump 106 communicatively coupled to the water circulation system 100 is below a predetermined threshold associated with the performance of the pump 106 under a non-circulating water volume condition of the water circulation system 100.

The threshold can be a value approximating an expected magnitude of power consumed by the pump 106 in a dry state condition. In a further embodiment, the water volume monitor determines whether the detected pressure measurement of the pressure sensor 134 communicatively coupled to filter 112 is below a predetermined threshold associated with a pressure of the water circulation system 100 under a non-circulating water volume condition of the water circulation system 100. The threshold can be a value approximating an expected magnitude of pressure at the pump 106 in a dry state condition. In yet a further embodiment, the water volume monitor determines whether the detected vacuum pressure measurement of the vacuum sensor 138 of the water circulation system 100 is below a predetermined threshold associated with a vacuum pressure of the water circulation system 100 under a non-circulating water volume condition of the water circulation system 100. The threshold can be a value approximating an expected magnitude of vacuum pressure at the pump 106 in a dry state condition.

In another embodiment, the process includes providing a pump device having the power sensor 602 and a processor operably configured to perform steps 702 and 704. In another embodiment, the process includes providing the water volume monitoring device 102 communicatively coupled in series between the power line 116 and the pump 106 and the device 102 includes a processor operable for perform steps 702 and step 704.

At step 706, the water volume monitor queries whether there is a low water volume operating condition. If the answer is no, the process returns to step 702, and the process continues. If the answer is yes, the process continues to step 708, where in response to determining that the ancillary device is performing under the low water volume operation, the water volume monitor performs a particular responsive predetermined action, or, stated another way, the water volume monitor (or rather its processor) executes computer executable instructions to perform the responsive predetermined action. For example, in one embodiment, the water volume monitor indicates the low water volume operation via an external interface. Such low water volume indication may be formed as, for example, a visual alarm, an audio alarm, an email notification to a user associated with the water volume monitor as well as other such electronic communication (e.g., a phone call, an SMS notification, a third-party api trigger, a weather station data upload, and the like). As is known by those of ordinary skill in the computing arts, "api" is an acronym for Application Programming Interface, which is a set of definitions, protocols, tools and the like that can be used by software applications to interface with a third-party software application and its associated servers and databases.

At step 710, in response to determining that the ancillary device is performing under the low water volume operation, the water volume monitor communicates to the water-flow control device 120 to add fresh water to the water circulation system 100. In one embodiment, step 710 occurs automatically, i.e. without requiring input from the user. In an alternative embodiment, step 710 requires approval from the user prior to adding fresh water.

In step 712, the water volume monitor queries whether a stop condition is met. If the stop condition is met, the process continues to step 714, where the water volume monitor communicates to the water-flow control device to stop adding fresh water. If the stop condition is not met, the process moves to step 710, where the water volume monitor continues to add fresh water until the stop condition is met. In one embodiment, the stop condition is a predetermined time period and fresh water is added to the water circulation system 100 for the predetermined time period, which may be saved in memory. In another embodiment, the stop condition is a user-input time period and fresh water is added to the water circulation system 100 for the user-input time period. In another embodiment, the water volume monitor communicates to the water-flow control device 120 to add fresh water to the water circulation system 100 for an environmental-dependent time period. As used herein, the term "environmental-dependent time period" is intended to indicate any time period that is determined by considering environmental factors in which the water circulation system 100 exists. This can be, for example, the size and dimensions of the reservoir 108, the current season, precipitation rates, ambient temperature, and/or humidity.

In step 716, the process queries whether the water volume monitor should continue monitoring water volume. If the answer is yes, the process continues to step 702, and the cycle repeats. If the answer is no, the process ends at step 718. In a preferred embodiment, the water volume monitor continuously and passively monitors water volume, as an ongoing process to continuously correct low water volume conditions that may arise within the system 100.

Referring again briefly to FIG. 1, in one embodiment, the motor 118 of the pump 106 may be a variable speed motor and the pump 106 may be considered a recirculation pump. In a further embodiment, the processor communicatively coupled to the pump 106 may be operably configured to determine a speed that the pump 106 is operating at for purposes of determining an optimal speed for the pump 106. In other words, the processor communicatively coupled to the pump 106 may be operably configured to monitor a speed at which the variable speed motor of the pump 106 is running.

In one embodiment, instead of automatically adding water to the pool 108 in response to a low water level condition being detected, as in some embodiment described herein above, the pump 106 (or more specifically the processor coupled to the pump 106) may perform other techniques or steps to remedy or ameliorate the low water level condition. For example, in one embodiment, if sinusoidal fluctuations in the pump's power measurements are detected by the processor, it may be presumed that the pump 106 (or more specifically the motor 118 of the pump 106) is operating at a speed higher than an optimal speed, causing the pump 106 to draw in air, as well as, water (aerated water). Accordingly, the processor may be operably configured to determine an optimal speed of the pump 106, the "optimal speed of the pump" being a maximum speed the pump 106 can operate at without pumping in air or aerated water due to a low-range pool water level. In other words, the processor may adjust the speed of the pump 106 to be at or below the optimal speed so that the flow into the pump 106 is no longer sufficient to draw more air into the pump 106.

As an example of the processor determining the optimal speed, the processor may access a predetermined speed-to-power look-up table stored in a non-transitory memory in order to match a peak power reading during measured sinusoidal fluctuations to an optimal speed for the pump 106. An exemplary lookup table is as follows:

TABLE 1

(Speed-to-Power Lookup Table)

| Actual Speed | Power |
| --- | --- |
| 600 | 35 |
| 700 | 41 |
| 900 | 50 |
| 1000 | 60 |
| 1200 | 87 |
| 1400 | 141 |
| 1500 | 156 |
| 1700 | 185 |
| 1800 | 230 |
| 1900 | 251 |
| 2000 | 290 |
| 2200 | 389 |
| 2300 | 450 |
| 2400 | 493 |
| 2500 | 547 |
| 2700 | 688 |
| 2800 | 772 |
| 3000 | 946 |
| 3100 | 1000 |
| 3300 | 1269 |
| 3450 | 1430 |

In table 1 above, the actual speed of the pump 106 may be in revolutions-per-minute (RPMs) and the power measurement of the pump 106 may be in watts. The speed-to-power lookup table may be systematically acquired by the processor over a period of time (knowing that there is sufficient water to support the highest speed) adjusting the speed of the pump 106 and storing/recording a power level before adjusting it again. In other words, the processor may continuously, periodically update the speed-to-power lookup table by detecting that an active speed of the pump 106 is running at a stable power reading, thereby establishing an empirical speed-to-power reference.

Figure 11:
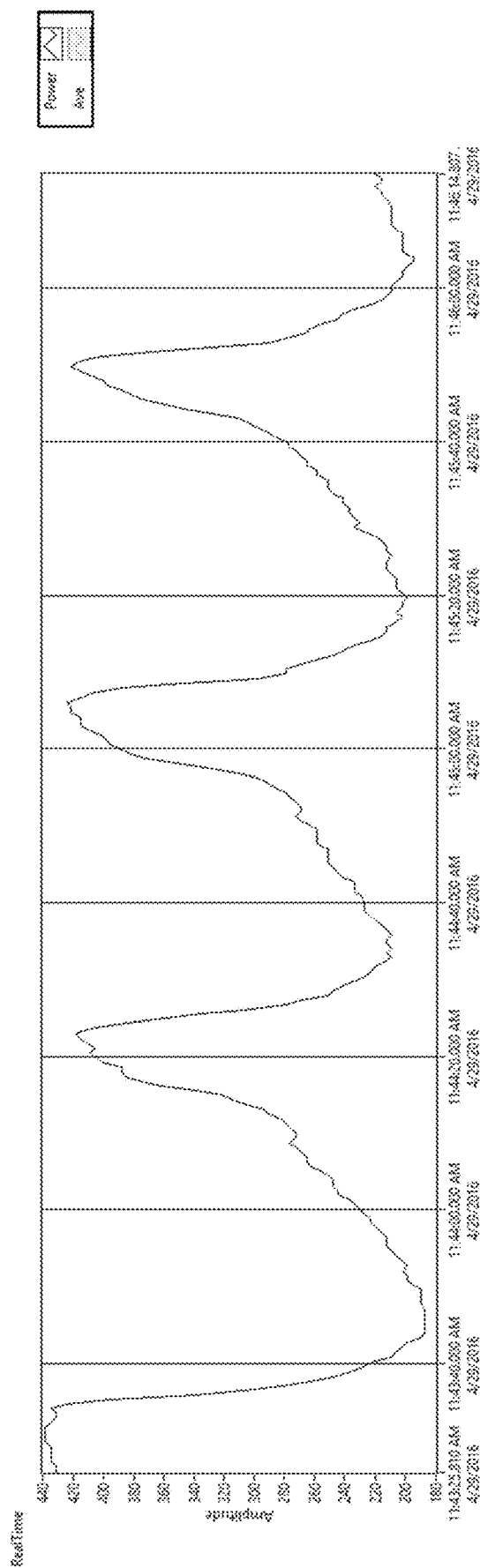
FIG. 11 is an exemplary sinusoidal graph of power measurements of the pump over time showing the peak power measurements, in accordance with the present invention.

With reference to the exemplary sinusoidal fluctuations of pump power measurements, over time, depicted in the graph 1100 shown in FIG. 11, an example of how the speed-to-power lookup table may be used in some embodiments to calculate the optimal speed of the pump 106 is described. FIG. 11 shows that the peak power of the sinusoidal fluctuations maxes out at about 410 watts after the sinusoidal fluctuations are initially detected by the processor. From the speed-to-power lookup table shown herein above as Table 1, it can be seen that an optimal speed is somewhere between 2200 RPM (at 389 Watts) and 2300 RPM (at 450 Watts). These values can be plugged into the following formula to calculate a more exact measurement of the optimal speed:

$$\text{optimal speed} = \sqrt{\text{peak} \cdot \text{power}} * \frac{ref1 \cdot \text{speed} + ref2 \cdot \text{speed}}{\sqrt{ref1 \cdot \text{power}} + \sqrt{ref2 \cdot \text{power}}}$$

In this illustrative example, the peak power is at 410 watts. With the reference speeds and power values corresponding to this peak power, according to the predetermined speed-to-power lookup table, the optimal speed can be calculated by:

$$\text{optimal speed} = \sqrt{410} * \frac{2200 + 2300}{\sqrt{389} + \sqrt{450}},$$

which results in optimal speed=2225.85.

In a further embodiment, it may be desirable to convert the calculated optimal speed value (e.g., 2225.85 RPMs) into a percentage value, which may be more understandable to an unsophisticated user. Continuing with our example, the speed-to-power lookup table shows a minimum pump speed of 600 RPMs and a maximum pump speed of 3450 RPMs (which min and max values may depend on a model of the pump). With such data from the speed-to-power lookup table, the processor can convert the optimal speed in RPMs to a percentage value of an available speed range, in accordance with the following formula:

$$\text{pool level \%} = \frac{\text{optimal pump speed} - \text{minimum pump speed}}{\text{maximum pump speed} - \text{minimum pump speed}}$$

Using the exemplary values described above, the percentage value can be calculated as:

$$\text{pool level \%} = \frac{2225.85 - 600}{3450 - 600} = 0.5705 = 57.05\%$$

As would be recognized by those of ordinary skill in the art, such calculations and formulas would not make sense without a variable speed motor, which is therefore required for such embodiments of the present invention.

In yet a further embodiment, the processor may be operably configured to convert the percentage value to a custom format determined by the user via a user input. For example, in one embodiment, the user may input/set 0% to −1 inch and the user may input/set 100% to +3 inches, with 0 inches being a preferred water level. Accordingly, a custom value pool level set by the user's input may be determined by the processor according to the following formula:

$$\text{pool level (custom value)} = ((\max - \min) * \text{pool level \%}) + \min =$$

$$((3 - (-1)) * 0.5705) + (-1) = 1.282 \text{ inches}$$

The processor may be communicatively coupled to an electronic display, or other user interface, that may display for the user the water level in the user's pool in the user's custom format. In the example above, the display may display a value of "1.282 inches" above the preferred pool water level. Accordingly, no refill of the pool 108 is required.

As explained herein above (in the discussion of the standalone monitor versus the smart pump), it should be understood that the processing device/processor performing such calculations and equations discussed herein may be located within a pump housing for the pump, or may be a standalone unit separate from the pump, but should still be communicatively coupled to the pump so as to monitor pump power measurements and other pump parameters. Such processor may also be preferrably communicatively coupled to various control and i/o features in the system, such as water flow control valves, user input interfaces, user output displays, and the like. Also, in some embodiments the processing tasks and techniques described herein may be split amongst more than one processor, as should be understood by those of ordinary skill in the computing arts.

In alternative embodiments, different configurations of lookup table(s) may be used to improve the pump 306 operation. For example, instead of a speed-to-power lookup table, there may be a predetermined water level-to-power lookup table stored in the non-transitory memory, accessed by the processor, and systematically collected, similar to the speed-to-power lookup table described herein above. The water level-to-power lookup table may be accessible by the processor to determine a water level corresponding to a measured drop in pump power consumption, as depicted, for example, in the power consumption graph shown in FIG. 2. Such a water level-to-power lookup table may allow the processor to quickly make a determination as to a possible water level condition corresponding to the measured pump power consumption.

In one embodiment, the processor coupled to the pump 306 may be coupled to a user interface and the processor may prompt the user, via the user interface, to measure a current water level within the pool. The processor may receive a user input of said user-measured water level and may store said user-measured water level in the water level-to-power lookup table in reference to an average peak power reading during a time period that the user measured the current water level within the pool. In a further embodiment, the processor may calculate a water level within the pool according to the following formula:

$$\text{water level} = \sqrt{\text{peak} \cdot \text{power}} * \frac{\text{ref1} \cdot \text{level} + \text{ref2} \cdot \text{level}}{\sqrt{\text{ref1} \cdot \text{power}} + \sqrt{\text{ref2} \cdot \text{power}}},$$

where ref1.level, ref2.level, ref1.power, and ref2.power are water level values and power values, respectively, from the predetermined water level-to-power lookup table.

Figure 8:
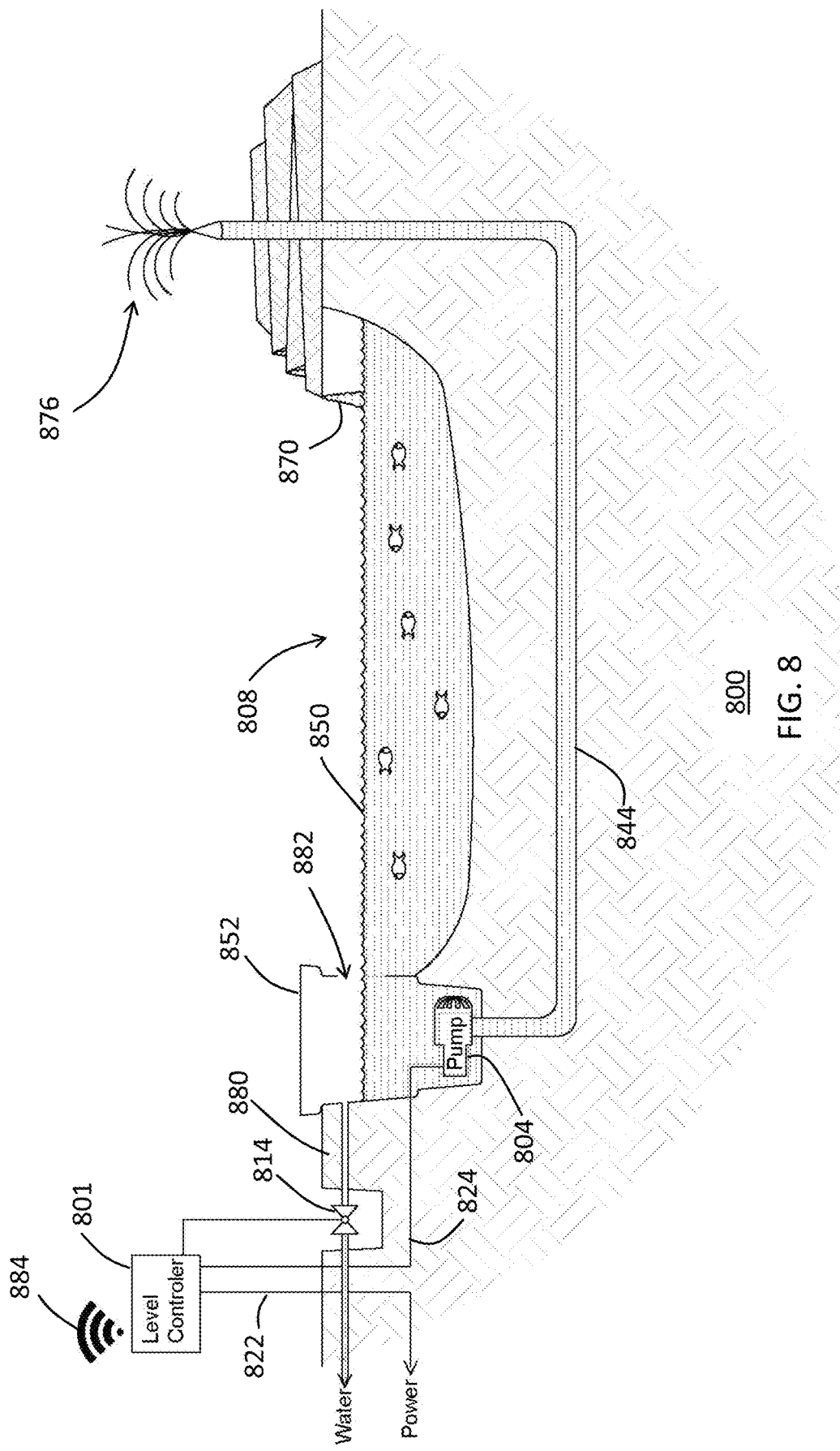
FIG. 8 is a schematic diagram of yet another exemplary implementation of a water circulation system in accordance with one embodiment of the present invention.

Referring now briefly to FIG. 8, yet another exemplary water circulation system 800 is shown in a schematic view, in accordance with the present invention. The system 800 is representative of a typical pond 808 installation and is intended to demonstrate that as long as a system involves a surface skimmer 852 coupled to a pool 808 of water via a skimmer intake 882, and a pump 804 operable to extract water from the surface skimmer 852, a water level processor or controller 801 can monitor the power consumed by the pump 804 by monitoring the pump power lines 822 and 824 and determining when the system 800 is running at an optimal water level 850, meaning that the plumbing is fully primed and no air is present in a pump discharge line 844. When the pump efficiency is affected by the presence of air in the system 800, the level controller 801 can detect a corresponding deviation within the power readings and actuate a water valve 814, which may be located underground 880 (as in FIG. 8), and/or may send a wireless notification with a network interface 884. Optional water features, such as a fountain 876 and a waterfall 870 should have no effect on the operation of the level controller 801, as long as such water features are installed on the pressure side, also known as the outlet of the pump 804.

Figure 9:
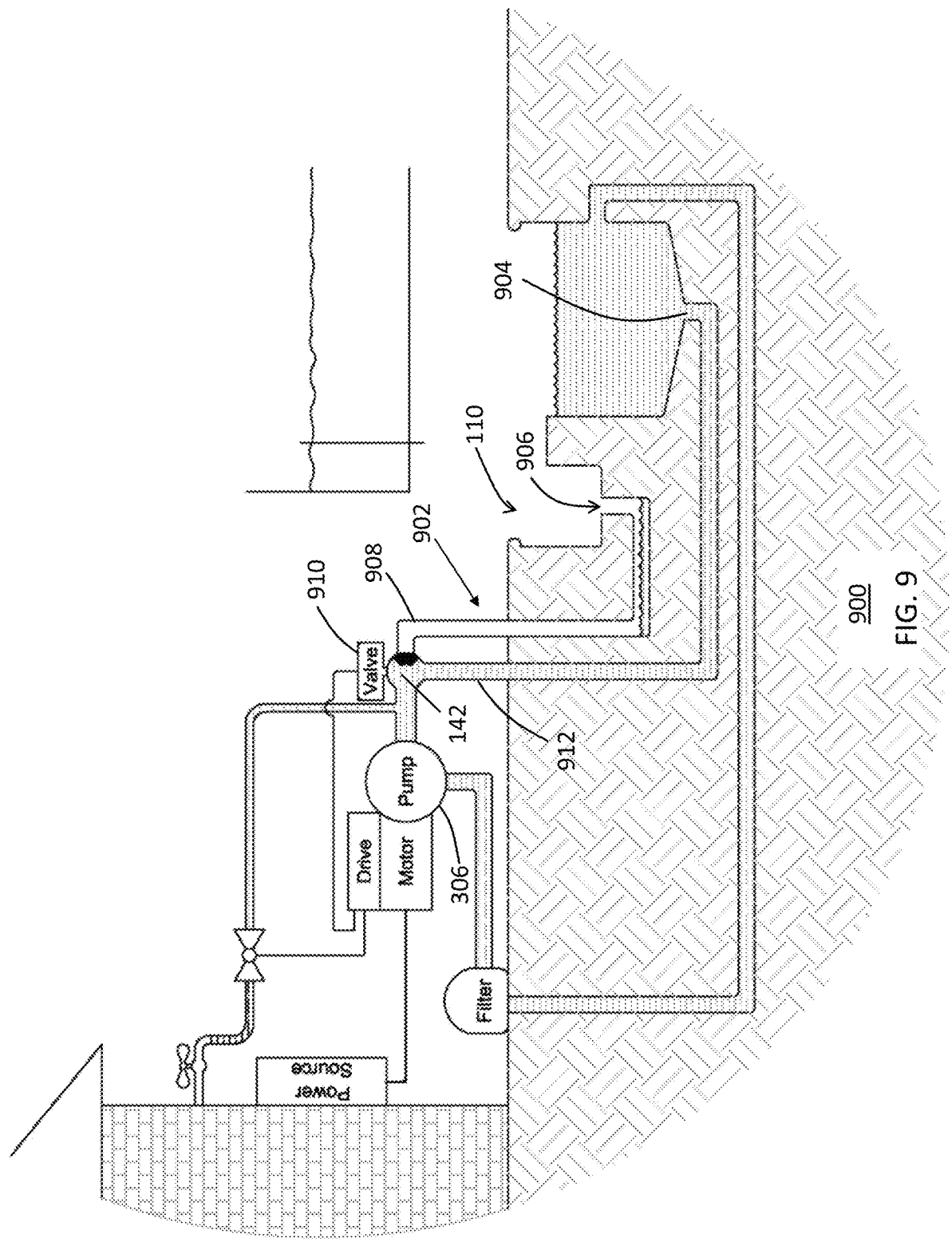
FIG. 9 is a schematic diagram of yet another exemplary implementation of a water circulation system with an flow selection valve, in accordance with the present invention.
Figure 10:
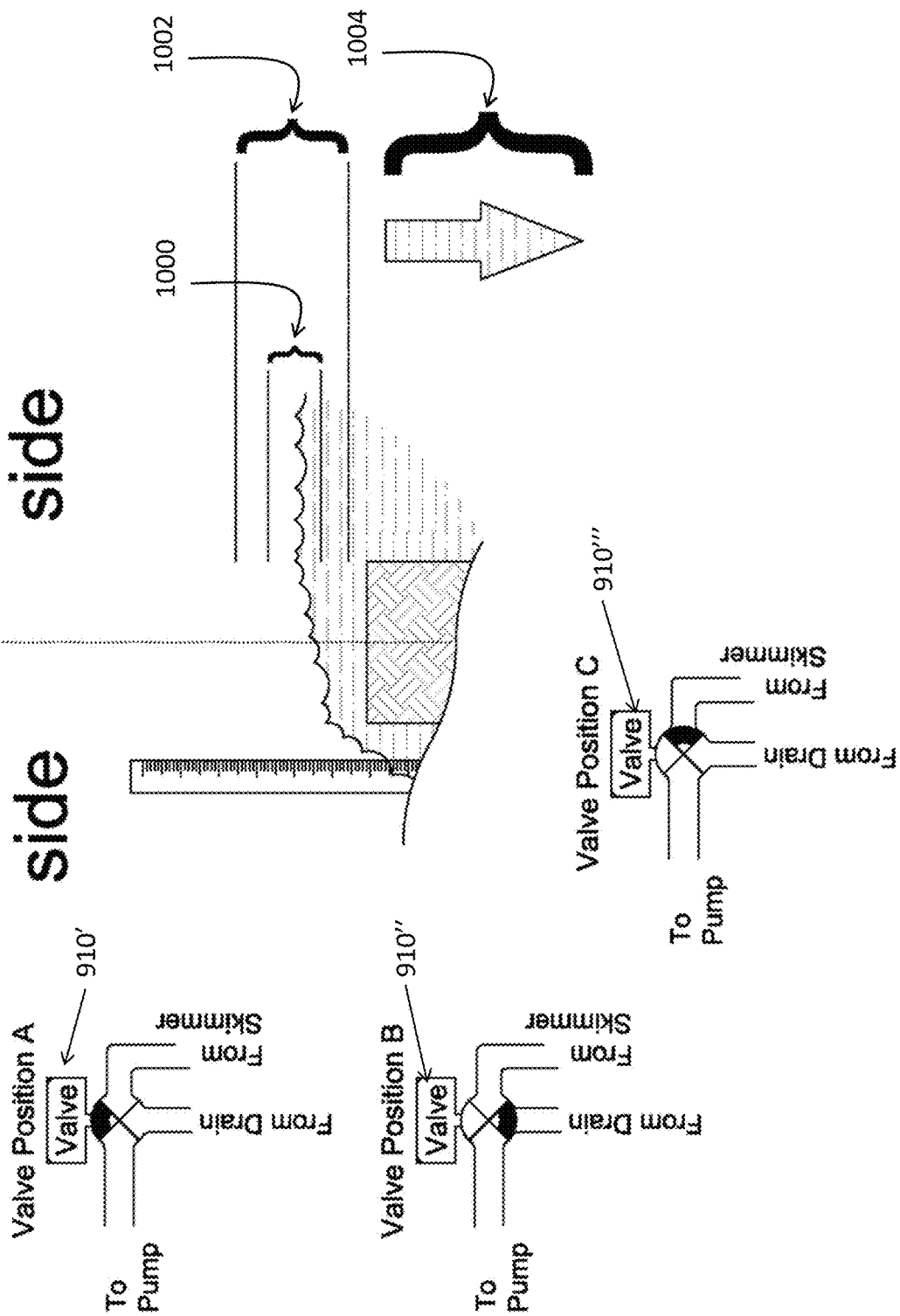
FIG. 10 is a schematic diagram illustrating the different selections corresponding to the flow selection valve introduced in FIG. 9, in accordance with an exemplary embodiment of the present invention.

Referring now primarily to FIG. 9, yet another exemplary water circulation system 900 in accordance with the present invention, is shown in a schematic view. The system 900 depicted in FIG. 9 is similar to the system 300 depicted in FIG. 3, except with a notable addition of a controllable flow selection valve 910 connected to the drive containing the water level control capabilities. As demonstrated by FIG. 9 as well as FIG. 10, an otherwise catastrophic failure can be entirely avoided by use of the controllable flow selection valve 910, which is an example of another response that can be configured to block the flow of water from the surface skimmer 110 in response to the processor coupled to the pump 306 detecting a low water condition. In other words, the valve 910 can turn off water flow from the surface skimmer 110 to avoid the pump 306 drawing in more air. FIG. 10 demonstrates and describes an exemplary operation of the controllable flow selection valve 910 to select between water flow into the pump inlet coming from either or both of the pool drain 904 and skimmer 110.

FIG. 10 demonstrates and describes an exemplary operation of the controllable inlet selection valve 910 to select between water flow into the pump inlet coming from either or both of the pool drain 904 and skimmer 110. More specifically, a range 1000 of indirect level detection when flow into the pump 306 is split between the skimmer 110 and the pool drain 904 is shown as a result of the processor selecting valve position A (910') for the controllable inlet selection valve 910. A range 1002 of indirect level detection when flow into the pump 306 is exclusively from the skimmer 110 is shown as a result of the processor selecting valve position B (910") for the controllable inlet selection valve 910. Normal operation may also be supported at lower than a minimum range by blocking the intake from the skimmer 110, as shown by a range 1004, which is a result of the processor selecting valve position C (910''') for the controllable inlet selection valve 910.

In one embodiment, the system 900 may include the flow selection valve 910 fluidically coupled to the pump inlet 142 and the pool plumbing 902 associated with the pool, which may include one or more pipes. The system 900 may also include a pool drain 904 disposed at or proximate a deepest end of the pool. The pool drain 904 may be fluidically coupled to the flow selection valve 910 via the pool plumbing 902. A skimmer outlet 906 may be disposed at or proximate a bottom surface of the surface skimmer 110. The skimmer outlet 906 may be fluidically coupled to the flow selection valve 910 via the pool plumbing 902. In one embodiment, the pool plumbing 902 may include a skimmer inlet 908 fluidically coupled between the skimmer outlet 906 and the pump inlet 142 and a pool drain inlet 912 fluidically coupled between the pool drain 904 and the pump inlet 142. The processor coupled to the pump 306 may be operably configured to operate the flow selection valve 910. In one embodiment, the processor may be operably configured to select, via the flow selection valve 910, only one of the skimmer inlet 908 and the pool drain inlet 912 to exclusively supply water to the pump through the pump inlet 142. Accordingly, a fractional flow from the pool drain 904 may be avoided during certain time periods so as to ensure a 1-to-1 correlation between an induced reference water flow and a flow through the area of the skimmer intake 160 (see FIG. 1) in order to allow the processor to more accurately and precisely measure the pool water level. In one embodiment, the processor coupled to the pump 306 may be operably configured to select, via the flow selection valve 910, only the pool drain inlet 912 to supply water to the pump 306 through the pump inlet 142 so as to selectively prevent a water flow from the surface skimmer 110 to the pump 306. Accordingly, a fractional flow from the surface skimmer 110 may be avoided during certain time period where it may be desirable to prevent the pool water level from having an effect on the speed at which the pump 306 operates.

In yet another embodiment, the processor coupled to the pump 306 may be operably configured to periodically switch, via the flow selection valve 910, between an exclusive water supply to the pump 306 being the skimmer inlet 908 (for surface cleaning) or being the pool drain inlet 912 (for settlement recirculation). It is conventional practice to split the flow into a pump roughly equal between the pool drain and the surface skimmer. However, because surface skimmers usually require a prolonged period of time at a minimum flow rate in order to effectively clean the water surface, a lot of energy can be wasted because the pool drain does not require nearly as much flow/duration to properly recirculate the sediment. Some pool chemicals, such as chlorine, are actually heavier than the water and therefore tend to sink to the bottom of the pool. In such pool systems, unless the pump draws in the chemical reach water from the bottom of the pool and redistributes it across the water jets, many of such pool chemicals will not keep the pool clean because they will settle at the bottom of the pool. Accordingly, in one embodiment of the present invention, the processor may be operably configured to periodically switch, via the flow selection valve 910, an exclusive water supply to the pump 306 between the skimmer inlet 908 and the pool drain inlet 912 at durations that are more efficient and correspond more closely to the actual duration suitable for surface cleaning and settlement recirculation, respectively. Such durations of time may include one predetermined time period for the skimmer inlet 908 to be the exclusive water supply to the pump 306 and a different predetermined time period for the pool drain inlet 912 to be the exclusive water supply to the pump 306.

In one embodiment, water flow from the surface skimmer 110 to the pump 306 may be prevented by the processor, via controlling the flow selection valve 910, as a response to the processor determining that the optimal speed for the pump 306 has fallen below a predetermined threshold level. Doing so may prevent excess air from being introduced into the system 900 through the surface skimmer 110 and may still allow the pool to continue operation with the pool water level being below the optimal level suitable for normal operation of the pool.

In another embodiment, water flow into the pool from the fresh water valve 120 (see FIG. 1) may be prevented by the processor coupled to the pump 106 controlling the fresh water valve 120, in response to the processor detecting a change to the power measurements of the pump 106.

A water volume monitoring apparatus, system and method has been disclosed that uses non-water-related measurements of ancillary support equipment in order to detect low water volume conditions, which can cause harm to ancillary support equipment and result in unfiltered, unclean water. Advantageously, the present invention can be installed at, within, or substantially proximate ancillary support equipment, which is typically disposed out of sight from the primary reservoir area, thereby not presenting a tripping hazard or an eyesore, as with prior art devices. Further, inventive methods, systems, and various techniques for monitoring and maintaining pool water level and increasing efficiency and convenience of pool equipment have been described.

What is claimed is:

1. A method for making use of an indirect measurement of a pool water level, the method comprising steps of:
providing a main water reservoir formed as a pool, the pool being an artificial structure operably configured to store and recirculate water contained within;
providing an ancillary reservoir formed as a surface skimmer fluidically coupled, via a skimmer intake, to the pool;
providing a recirculation pump, the recirculation pump being coupled to a processor and the recirculation pump being fluidically coupled to the surface skimmer such that the recirculation pump is operable to pump water, aerated water, and air from the surface skimmer;
pumping, by the recirculation pump, from the surface skimmer, water, aerated water, or air, wherein:
the recirculation pump pumps water from the surface skimmer when a water level in the pool is within a high-range such that air does not mix with water in the surface skimmer;
the recirculation pump pumps aerated water from the surface skimmer when the water level in the pool is within a mid-range that is lower than the high range such that air and water mix in the surface skimmer;
the recirculation pump pumps air from the surface skimmer when the water level in the pool is in a low range that is lower than the mid-range where the water level in the pool is below a bottom of the skimmer intake such that water does not flow from the pool to the surface skimmer;
determining, by the processor coupled to the recirculation pump, an estimated level at which the pool water level should be by analyzing power measurements of the recirculation pump, the power measurements of the recirculation pump being different when pumping water, aerated water, and air; and
executing, by the processor coupled to the recirculation pump, a computer executable instruction to perform at least one predetermined action based on the determination made by the processor by analyzing the power measurements of the recirculation pump in the determining step.

2. The method in accordance with claim 1, wherein:
the recirculation pump includes a variable speed motor; and
the processor coupled to the recirculation pump is further operably configured to determine a speed that the recirculation pump is operating at.

3. The method in accordance with claim 2, wherein the determining step further includes:
the processor recognizing that the power measurements are sinusoidal-like;
as a result of the processor recognizing that the power measurements are sinusoidal-like, the processor further determining that the pool water level is within the mid-range;
the processor storing in at least one non-transitory memory a peak power over a predetermined time period after sinusoidal fluctuations are initially detected by the processor; and
the processor accessing at least one predetermined speed-to-power lookup table, stored in the at least one non-transitory memory, in order to match a peak power reading during measured sinusoidal fluctuations to an optimal speed for the recirculation pump, the optimal speed of the recirculation pump being a maximum speed the recirculation pump can operate at without pumping in air due to a low-range water level.

4. The method in accordance with claim 3, wherein:
the least one predetermined speed-to-power lookup table, accessible by the processor coupled to the recirculation pump, is updated when the processor detects that an active speed of the recirculation pump is running at a stable power reading, thereby establishing an empirical speed-to-power reference.

5. The method in accordance with claim 3, wherein:
the determining step further includes the processor determining the optimal speed using the following formula:

$$\text{optimal speed} = \sqrt{\text{peak power}} * \frac{ref1 \cdot speed + ref2 \cdot speed}{\sqrt{ref1 \cdot power} + \sqrt{ref2 \cdot power}}$$

wherein ref1.speed, ref2.speed, ref1.power, and ref2.power are speed values and power values from the at least one-pre-determined speed-to-power lookup table stored in the non-transitory memory accessible by the processor.

6. The method in accordance with claim 5, wherein:
an indirect measurement of the pool water level is communicated by the processor coupled to the recirculation pump as a percentage of an available speed range, as determined by a minimum pump speed and a maximum pump speed and the optimal pump speed in accordance with the following formula:

$$\text{pool level \%} = \frac{\text{optimal pump speed} - \text{minimum pump speed}}{\text{maximum pump speed} - \text{minimum pump speed}}.$$

7. The method in accordance with claim 6, wherein:
the indirect measurement of the pool water level is converted by the processor to a user custom format determined by the following formula:
custom value pool level=((max min) * pool level %)+min where the max and min in said formula are user-input values.

8. The method in accordance with claim 3, further comprising steps of:
providing at least one controllable flow selection valve fluidically coupled to a pump inlet and the pool plumbing associated with the pool;
providing at least one pool drain disposed at or proximate a deepest end of the pool, said at least one pool drain being fluidically coupled to the at least one controllable flow selection valve via the pool plumbing; and
providing a skimmer outlet disposed at or proximate a bottom of the surface skimmer, said skimmer outlet being fluidically coupled to the at least one controllable flow selection valve via the pool plumbing.

9. The method in accordance with claim 8, wherein:
the processor coupled to the recirculation pump is further operably configured to select, via the at least one controllable flow selection valve, only one of the skimmer inlet and the pool drain inlet to supply water to the recirculation pump through the pump inlet.

10. The method in accordance with claim 8, wherein:
the processor coupled to the recirculation pump is further operably configured to select, via the at least one controllable flow selection valve, only the pool drain inlet to supply water to the recirculation pump through the pump inlet so as to selectively prevent a water flow from the surface skimmer to the recirculation pump.

11. The method in accordance with claim 8, wherein:
the processor coupled to the recirculation pump is further operably configured to periodically switch, via the at least one controllable flow selection valve, an exclusive water supply to the recirculation pump between the skimmer inlet and the pool drain inlet.

12. The method in accordance with claim 8, wherein:
the at least one predetermined action includes preventing a water flow from the surface skimmer to the recirculation pump by the processor controlling the controllable flow selection valve in response to the optimal speed falling below a predetermined level.

13. The method in accordance with claim 1, further comprising:
providing a fresh water plumbing system fluidically coupled to the pool and at least one controllable fresh water valve fluidically coupled to a fresh water source and controllable by the processor coupled to the recirculation pump; and
the computer executable instructions, executable by the processor, to perform the at least one predetermined action based on the pump power measurements includes an instruction to control the fresh water valve to refill the pool to raise the pool water level by adding water from the fresh water source.

14. The method in accordance with claim 13, wherein:
a water flow into the pool, from a controllable fresh water valve, is prevented by the processor coupled to the recirculation pump, in response to the processor detecting a change to the power measurements of the recirculation pump.

15. The method in accordance with claim 1, wherein:
the computer executable instructions, executable by the processor, to perform the at least one predetermined action based on the pump power measurements includes an instruction to transmit at least one pool water level indication, the pool water level indication being formed as at least one of a visual alarm, an email notification, a SMS notification, a phone call, a weather station data upload, and a third-party application programming interface trigger.

16. The method in accordance with claim 1, wherein the determining step further includes:
the processor recognizing that the power measurements are sinusoidal-like;
as a result of the processor recognizing that the power measurements are sinusoidal-like, the processor further determining that the pool water level is within the mid-range;
the processor storing in at least one non-transitory memory a peak power over a predetermined time period after sinusoidal fluctuations are initially detected by the processor; and the processor accessing at least one predetermined level-to-power lookup table, stored in the at least one non-transitory memory, to determine a water level corresponding to a measured drop in pump power consumption.

17. The method in accordance with claim 16, wherein:
the computer executable instructions, executable by the processor, to perform the at least one predetermined action based on the pump power measurements includes an instruction to prompt a user to measure a current water level within the pool.

18. The method in accordance with claim 17, wherein the processor is further operable to:
receive a user input of the measured current water level within the pool; and
store said user-measured current water level in a look up table stored in the non-transitory memory in reference to an average peak power reading during a time period that the user measured the current water level within the pool.

19. The method in accordance with claim 16, wherein the determining step further includes:
the processor calculating the water level within the pool according to the following formula:

$$\text{water level} = \sqrt{\text{peak} \cdot \text{power}} * \frac{\text{ref}1 \cdot \text{level} + \text{ref}2 \cdot \text{level}}{\sqrt{\text{ref}1 \cdot \text{power}} + \sqrt{\text{ref}2 \cdot \text{power}}}$$

wherein ref1.level, ref2.1level, ref1.power, and ref2.power are water level values and power values from at least one predetermined water level-to-power lookup table stored in the non-transitory memory accessible by the processor.

20. The method in accordance with claim 16, further comprising steps of:
providing at least one controllable flow selection valve fluidically coupled to the pump inlet and the pool plumbing associated with the pool;
providing at least one pool drain disposed at or proximate a deepest end of the pool, said at least one pool drain being fluidically coupled to the at least one controllable flow selection valve via the pool plumbing;
providing a skimmer outlet disposed at or proximate a bottom of the surface skimmer, said skimmer outlet being fluidically coupled to the controllable flow selection valve via the pool plumbing; and
wherein the computer executable instructions, executable by the processor, to perform the at least one predetermined action based on the pump power measurements includes an instruction to change a state of the at least one controllable flow selection valve to prevent a water flow from the surface skimmer for a predefined period of time.

* * * * *